United States Patent
Goodyear et al.

(10) Patent No.: US 10,572,954 B2
(45) Date of Patent: Feb. 25, 2020

(54) METHOD AND SYSTEM FOR SEARCHING FOR AND NAVIGATING TO USER CONTENT AND OTHER USER EXPERIENCE PAGES IN A FINANCIAL MANAGEMENT SYSTEM WITH A CUSTOMER SELF-SERVICE SYSTEM FOR THE FINANCIAL MANAGEMENT SYSTEM

(71) Applicant: Intuit Inc., Mountain View, CA (US)

(72) Inventors: Todd Frey Goodyear, San Diego, CA (US); Benjamin Indyk, San Diego, CA (US); Igor A. Podgorny, San Diego, CA (US); Christopher C. Gielow, Carlsbad, CA (US); Jonathan Chay, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 547 days.

(21) Appl. No.: 15/293,614

(22) Filed: Oct. 14, 2016

(65) Prior Publication Data
US 2018/0108092 A1  Apr. 19, 2018

(51) Int. Cl.
*G06Q 40/00* (2012.01)
*G06F 16/903* (2019.01)

(52) U.S. Cl.
CPC ..... *G06Q 40/123* (2013.12); *G06F 16/90335* (2019.01)

(58) Field of Classification Search
None
See application file for complete search history.

(56) References Cited

U.S. PATENT DOCUMENTS 5,471,382 A  11/1995 Tallman et al.
5,519,608 A  5/1996 Kupiec
(Continued)

FOREIGN PATENT DOCUMENTS

CN  101520802  4/2009
EP  2159715  3/2010
(Continued)

OTHER PUBLICATIONS

"Shuguang Han, Zhen Yue, Daqing He, Understanding and Supporting Cross-Device Web Search for Exploratory Tasks with Mobile Touch Interactions, Apr. 2015, ACM Transactions on Information System, vol. 33, No. 4, p. 1-35" (Year: 2015).*
(Continued)

*Primary Examiner* — Kito R Robinson
*Assistant Examiner* — Toan Duc Bui
(74) *Attorney, Agent, or Firm* — Paradice and Li LLP

(57) ABSTRACT

Disclosed methods and systems provide domain-specific incremental search results for search query terms with a customer self-service system for a financial management system, according to one embodiment. Incremental search results are search results that are generated for search query terms, as a user enters the search query terms as part of a search query to a customer self-service system, according to one embodiment. The customer self-service system receives search query terms (e.g., a partial search query) in a search text box, searches user content (e.g., business transactions, personal transactions, etc.) and customer self-service system content for content that is relevant to the search query terms, and provides incremental search results navigation links within a results text box to enable users to easily see search results (e.g., transaction records) and to enable users to navigate to transactions records or other user content, from the results text box, according to one embodiment.

30 Claims, 9 Drawing Sheets

(56) References Cited

U.S. PATENT DOCUMENTS

| | | | |
|---|---|---|---|
| 5,701,399 A | 12/1997 | Lee et al. | |
| 6,006,218 A | 12/1999 | Breese et al. | |
| 6,147,975 A | 11/2000 | Bowman-Amuah | |
| 6,513,036 B2 | 1/2003 | Fruensgaard et al. | |
| 6,601,055 B1 | 7/2003 | Roberts | |
| 6,708,172 B1 | 3/2004 | Wong et al. | |
| 6,853,982 B2 | 2/2005 | Smith et al. | |
| 7,013,263 B1 | 3/2006 | Isaka et al. | |
| 7,222,078 B2 | 5/2007 | Abelow | |
| 7,385,716 B1 | 6/2008 | Skaanning | |
| 7,565,312 B1 * | 7/2009 | Shaw | G06Q 40/02 705/30 |
| 7,594,176 B1 | 9/2009 | English | |
| 7,610,226 B1 * | 10/2009 | Miller | G06Q 20/207 705/19 |
| 7,685,144 B1 | 3/2010 | Katragadda | |
| 7,739,286 B2 | 6/2010 | Sethy et al. | |
| 7,747,601 B2 | 6/2010 | Cooper et al. | |
| 7,974,860 B1 | 7/2011 | Travis | |
| 8,010,545 B2 | 8/2011 | Stefik et al. | |
| 8,019,753 B2 | 9/2011 | Podgorny et al. | |
| 8,200,527 B1 | 6/2012 | Thompson et al. | |
| 8,311,792 B1 | 11/2012 | Podgorny et al. | |
| 8,311,863 B1 | 11/2012 | Kemp | |
| 8,341,167 B1 | 12/2012 | Podgorny et al. | |
| 8,478,780 B2 | 7/2013 | Cooper et al. | |
| 8,484,228 B2 | 7/2013 | Bhattacharyya et al. | |
| 8,645,298 B2 | 2/2014 | Hennig et al. | |
| 8,660,849 B2 | 2/2014 | Gruber et al. | |
| 8,805,734 B2 | 8/2014 | Diana et al. | |
| 8,817,968 B1 | 8/2014 | Boutcher et al. | |
| 8,892,539 B2 | 11/2014 | Anand et al. | |
| 8,909,568 B1 | 12/2014 | Mann et al. | |
| 8,935,192 B1 | 1/2015 | Ventilla et al. | |
| 8,943,145 B1 | 1/2015 | Peters et al. | |
| 8,983,977 B2 | 3/2015 | Ishikawa et al. | |
| 9,015,031 B2 | 4/2015 | Ferrucci et al. | |
| 9,037,578 B2 | 5/2015 | Brust et al. | |
| 9,060,062 B1 | 6/2015 | Madahar et al. | |
| 9,063,983 B1 | 6/2015 | Lee | |
| 9,247,066 B1 | 1/2016 | Stec et al. | |
| 9,336,211 B1 | 5/2016 | Bousquet et al. | |
| 9,336,269 B1 | 5/2016 | Smith et al. | |
| 9,342,608 B2 | 5/2016 | Cook et al. | |
| 9,460,191 B1 | 10/2016 | Gaucher et al. | |
| 9,471,883 B2 | 10/2016 | Chatterjee et al. | |
| 9,582,757 B1 | 2/2017 | Holmes et al. | |
| 9,633,309 B2 | 4/2017 | Giffels et al. | |
| 9,767,169 B1 | 9/2017 | Paff et al. | |
| 9,779,388 B1 | 10/2017 | Hansen et al. | |
| 9,887,887 B2 | 2/2018 | Hunter et al. | |
| 9,892,367 B2 | 2/2018 | Guo et al. | |
| 9,910,886 B2 | 3/2018 | Adams, Jr. et al. | |
| 10,002,177 B1 | 6/2018 | McClintock et al. | |
| 10,083,213 B1 | 9/2018 | Podgorny et al. | |
| 10,134,050 B1 | 11/2018 | Hung et al. | |
| 10,147,037 B1 | 12/2018 | Podgorny et al. | |
| 10,162,734 B1 | 12/2018 | Podgorny et al. | |
| 2002/0087387 A1 | 7/2002 | Calver et al. | |
| 2002/0111888 A1 | 8/2002 | Stanley et al. | |
| 2002/0111926 A1 | 8/2002 | Bebie | |
| 2002/0123983 A1 | 9/2002 | Riley et al. | |
| 2002/0169595 A1 | 11/2002 | Agichtein et al. | |
| 2003/0028448 A1 | 2/2003 | Joseph et al. | |
| 2003/0061131 A1 | 3/2003 | Parkan | |
| 2003/0099924 A1 | 5/2003 | Tsuboi et al. | |
| 2003/0101161 A1 * | 5/2003 | Ferguson | G05B 13/0265 |
| 2003/0144873 A1 | 7/2003 | Keshel | |
| 2004/0024739 A1 | 2/2004 | Copperman et al. | |
| 2004/0064442 A1 * | 4/2004 | Popovitch | G06F 16/951 |
| 2005/0114327 A1 | 5/2005 | Kumamoto et al. | |
| 2005/0137939 A1 | 6/2005 | Calabria et al. | |
| 2005/0246314 A1 | 11/2005 | Eder | |
| 2006/0064322 A1 | 3/2006 | Mascarenhas et al. | |
| 2006/0074788 A1 | 4/2006 | Grizack et al. | |
| 2006/0085255 A1 | 4/2006 | Hastings et al. | |
| 2006/0085750 A1 | 4/2006 | Easton et al. | |
| 2006/0253578 A1 | 11/2006 | Dixon et al. | |
| 2006/0265232 A1 | 11/2006 | Katariya et al. | |
| 2007/0011131 A1 | 1/2007 | Delefevre | |
| 2007/0192166 A1 | 8/2007 | Van Luchene | |
| 2007/0192168 A1 | 8/2007 | Van Luchene | |
| 2007/0192179 A1 | 8/2007 | Van Luchene | |
| 2007/0219863 A1 | 9/2007 | Park et al. | |
| 2007/0244900 A1 | 10/2007 | Hopkins et al. | |
| 2007/0259325 A1 | 11/2007 | Clapper | |
| 2007/0291739 A1 | 12/2007 | Sullivan et al. | |
| 2007/0294195 A1 | 12/2007 | Curry et al. | |
| 2008/0189197 A1 | 8/2008 | Allanson et al. | |
| 2008/0201413 A1 | 8/2008 | Sullivan et al. | |
| 2008/0208610 A1 | 8/2008 | Thomas et al. | |
| 2008/0215541 A1 | 9/2008 | Li et al. | |
| 2008/0294637 A1 | 11/2008 | Liu | |
| 2009/0012926 A1 | 1/2009 | Ishikawa et al. | |
| 2009/0077047 A1 | 3/2009 | Cooper et al. | |
| 2009/0119575 A1 | 5/2009 | Velusamy | |
| 2009/0158143 A1 * | 6/2009 | Arav | G06Q 10/107 715/261 |
| 2009/0162824 A1 | 6/2009 | Heck | |
| 2009/0248659 A1 | 10/2009 | McCool et al. | |
| 2009/0253112 A1 | 10/2009 | Cao et al. | |
| 2009/0259642 A1 | 10/2009 | Cao et al. | |
| 2009/0265340 A1 | 10/2009 | Barcklay et al. | |
| 2010/0068687 A1 | 3/2010 | Bertelsen | |
| 2010/0070554 A1 | 3/2010 | Richardson et al. | |
| 2010/0076847 A1 | 3/2010 | Heller | |
| 2010/0076998 A1 | 3/2010 | Podgorny et al. | |
| 2010/0088262 A1 | 4/2010 | Visel et al. | |
| 2010/0185630 A1 | 7/2010 | Cheng et al. | |
| 2010/0191686 A1 | 7/2010 | Wang et al. | |
| 2010/0203492 A1 | 8/2010 | Nibe et al. | |
| 2010/0205180 A1 | 8/2010 | Cooper et al. | |
| 2010/0205550 A1 | 8/2010 | Chen et al. | |
| 2010/0235361 A1 | 9/2010 | Chandran et al. | |
| 2010/0241971 A1 | 9/2010 | Zuber | |
| 2010/0318919 A1 | 12/2010 | Murphy et al. | |
| 2011/0055699 A1 | 3/2011 | Li et al. | |
| 2011/0071997 A1 | 3/2011 | Sullivan et al. | |
| 2011/0106895 A1 | 5/2011 | Ventilla et al. | |
| 2011/0125734 A1 | 5/2011 | Duboue et al. | |
| 2011/0202472 A1 | 8/2011 | Wan et al. | |
| 2011/0231347 A1 | 9/2011 | Xu et al. | |
| 2011/0246334 A1 | 10/2011 | Schoenberg et al. | |
| 2011/0264569 A1 | 10/2011 | Houseworth et al. | |
| 2011/0282892 A1 | 11/2011 | Castellani et al. | |
| 2012/0005148 A1 | 1/2012 | Horvitz et al. | |
| 2012/0005219 A1 | 1/2012 | Apacible et al. | |
| 2012/0022983 A1 | 1/2012 | Hughes et al. | |
| 2012/0030079 A1 | 2/2012 | Slater et al. | |
| 2012/0077178 A1 | 3/2012 | Bagchi et al. | |
| 2012/0084120 A1 | 4/2012 | Hirsch et al. | |
| 2012/0084185 A1 | 4/2012 | Ciaramitaro et al. | |
| 2012/0084293 A1 | 4/2012 | Brown et al. | |
| 2012/0095976 A1 | 4/2012 | Hebenthal et al. | |
| 2012/0101965 A1 | 4/2012 | Hennig et al. | |
| 2012/0130910 A1 | 5/2012 | Al-Alami | |
| 2012/0130978 A1 | 5/2012 | Li et al. | |
| 2012/0136764 A1 | 5/2012 | Miller et al. | |
| 2012/0166438 A1 | 6/2012 | Wu et al. | |
| 2012/0219142 A1 | 8/2012 | Gould | |
| 2012/0221557 A1 | 8/2012 | Edmonds et al. | |
| 2012/0233191 A1 | 9/2012 | Ramanujam | |
| 2012/0331052 A1 | 12/2012 | Rathod | |
| 2013/0019286 A1 | 1/2013 | Barborak et al. | |
| 2013/0024290 A1 | 1/2013 | Berg et al. | |
| 2013/0054497 A1 | 2/2013 | Garland et al. | |
| 2013/0066693 A1 | 3/2013 | Laird-McConnell et al. | |
| 2013/0073387 A1 | 3/2013 | Heath | |
| 2013/0073390 A1 | 3/2013 | Konig et al. | |
| 2013/0110671 A1 * | 5/2013 | Gray | G06Q 30/06 705/26.8 |
| 2013/0110823 A1 | 5/2013 | Su et al. | |
| 2013/0111323 A1 | 5/2013 | Taghaddos et al. | |
| 2013/0117677 A1 | 5/2013 | St. Jacques, Jr. | |

(56) References Cited

U.S. PATENT DOCUMENTS

| | | |
|---|---|---|
| 2013/0204876 A1 | 8/2013 | Szucs et al. |
| 2013/0224713 A1 | 8/2013 | Ajmera et al. |
| 2013/0268319 A1 | 10/2013 | Palombo |
| 2013/0282363 A1 | 10/2013 | Fan et al. |
| 2013/0285855 A1 | 10/2013 | Dupray et al. |
| 2013/0297545 A1 | 11/2013 | Biemer et al. |
| 2013/0297553 A1 | 11/2013 | Bierner |
| 2013/0297625 A1 | 11/2013 | Biemer et al. |
| 2013/0304730 A1 | 11/2013 | Zhou |
| 2013/0325992 A1 | 12/2013 | McGann et al. |
| 2013/0339870 A1 | 12/2013 | Tandra Sishtla et al. |
| 2014/0006012 A1 | 1/2014 | Zhou et al. |
| 2014/0022328 A1 | 1/2014 | Gechter et al. |
| 2014/0052496 A1 | 2/2014 | Diana et al. |
| 2014/0052606 A1 | 2/2014 | Vasudevan et al. |
| 2014/0075004 A1 | 3/2014 | Van Dusen et al. |
| 2014/0088944 A1 | 3/2014 | Natarajan et al. |
| 2014/0114822 A1 | 4/2014 | Sharma et al. |
| 2014/0119531 A1 | 5/2014 | Tuchman et al. |
| 2014/0172883 A1 | 6/2014 | Clark et al. |
| 2014/0189829 A1 | 7/2014 | McLachlan et al. |
| 2014/0195613 A1 | 7/2014 | Ogilvie |
| 2014/0201045 A1 | 7/2014 | Pai et al. |
| 2014/0222669 A1 | 8/2014 | Novak et al. |
| 2014/0244528 A1 | 8/2014 | Zhang et al. |
| 2014/0280070 A1 | 9/2014 | George et al. |
| 2014/0308648 A1 | 10/2014 | Jain |
| 2014/0316856 A1 | 10/2014 | Williams et al. |
| 2014/0324856 A1 | 10/2014 | Lahiani et al. |
| 2014/0337257 A1 | 11/2014 | Chatterjee et al. |
| 2014/0372980 A1 | 12/2014 | Verma et al. |
| 2015/0006344 A1 | 1/2015 | Saimani et al. |
| 2015/0052087 A1 | 2/2015 | Srinivasan et al. |
| 2015/0058380 A1 | 2/2015 | Polonsky et al. |
| 2015/0088608 A1 | 3/2015 | Cama et al. |
| 2015/0095267 A1 | 4/2015 | Behere et al. |
| 2015/0120718 A1 | 4/2015 | Luo et al. |
| 2015/0127587 A1 | 5/2015 | Pinckney et al. |
| 2015/0139415 A1 | 5/2015 | Skiba et al. |
| 2015/0170049 A1 | 6/2015 | Mann et al. |
| 2015/0213021 A1* | 7/2015 | He ............... G06F 16/24578 707/728 |
| 2015/0229531 A1 | 8/2015 | O'Sullivan et al. |
| 2015/0254785 A1 | 9/2015 | Yang et al. |
| 2015/0317197 A1 | 11/2015 | Blair |
| 2015/0324367 A1* | 11/2015 | Aravamudan ........ G06F 3/0481 707/728 |
| 2015/0324805 A1 | 11/2015 | Skiba et al. |
| 2015/0363481 A1 | 12/2015 | Haynes |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0062980 A1 | 3/2016 | Boguraev et al. |
| 2016/0078567 A1 | 3/2016 | Goldman et al. |
| 2016/0103833 A1 | 4/2016 | Sanders et al. |
| 2016/0148222 A1 | 5/2016 | Davar et al. |
| 2016/0148321 A1 | 5/2016 | Ciaramitaro et al. |
| 2016/0154856 A1 | 6/2016 | Olof-Ors et al. |
| 2016/0179816 A1* | 6/2016 | Glover .............. G06F 16/24578 707/749 |
| 2016/0180470 A1 | 6/2016 | Mascaro et al. |
| 2016/0189029 A1 | 6/2016 | Giffels et al. |
| 2016/0196497 A1 | 7/2016 | Allen et al. |
| 2016/0203523 A1 | 7/2016 | Spasojevic et al. |
| 2016/0217472 A1 | 7/2016 | Podgorny et al. |
| 2016/0283491 A1 | 9/2016 | Lu et al. |
| 2016/0306846 A1 | 10/2016 | Adams, Jr. et al. |
| 2016/0371276 A1 | 12/2016 | Furtado et al. |
| 2017/0011352 A1* | 1/2017 | Jones-McFadden ....................... G06Q 10/1095 |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0046623 A1 | 2/2017 | Murdock et al. |
| 2017/0124184 A1 | 5/2017 | Podgorny et al. |
| 2017/0228459 A1 | 8/2017 | Wang et al. |
| 2017/0262529 A1 | 9/2017 | Chim et al. |
| 2017/0270159 A1 | 9/2017 | Wang et al. |
| 2017/0323233 A1 | 11/2017 | Bencke et al. |
| 2018/0032523 A1 | 2/2018 | Singhal et al. |
| 2018/0032607 A1 | 2/2018 | Singhal et al. |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2018/0137203 A1 | 5/2018 | Hennekey et al. |
| 2019/0018692 A1 | 1/2019 | Indyk et al. |
| 2019/0018899 A1 | 1/2019 | Podgorny et al. |
| 2019/0065576 A1 | 2/2019 | Peng |
| 2019/0103035 A1 | 4/2019 | Beller et al. |

FOREIGN PATENT DOCUMENTS

| | | |
|---|---|---|
| JP | 2014112316 | 6/2014 |
| WO | WO 2011/053830 | 5/2011 |

OTHER PUBLICATIONS

"Stephen Fitchett, Andy Cockburn, An Empirical Characterisation of File Retrieval, Oct. 3, 2014, University of Canterbury, Christchurch, New Zealand, Int. J. Human-Computer Studies 74 (2015), p. 1-13" (Year: 2014).*

Bartolome et al., "Processing Unstructured Voice of Customer Feedback for Improving Content Rankings in Customer Support Systems," U.S. Appl. No. 15/094,653, filed Apr. 8, 2016.

Podgorny, et al., "Content Quality and User Ranking in TurboTax AnswerXchange," Proceedings of the European Conference on Social Media, University of Brighton UK, Jul. 10-11, 2014.

Blei, David M., et al. "Latent Dirichlet Allocation;" Journal of Machine Learning Research 3, Jan. 2003, pp. 993-1022.

Steyvers, Mark, et al. "Probabilistic Author-Topic Models for Information Discovery;" KDD'04, Aug. 22-25, 2004.

Mimno, David, et al., "Sparse Stochastic Inference for Latent Dirichlet Allocation," Proceedings of the 29th International Conference on Machine Learning, Edinburgh, Scotland, UK, 2012.

Blei, David M., "Probabilistic Topic Models," Communications of the ACM, Apr. 2012, vol. 55, No. 4, pp. 77-84.

Grant, Sheryl, et al., "The Human Face of Crowdsourcing: A Citizen-led Crowdsourcing Case Study;" 2013 IEEE International Conference on Big Data, Silicon Valley, CA, 2013, pp. 21-24.

Encyclopedia Britannica, "Graphical User Interface (GUI);" Sep. 5, 2015. Retrieved from the internet <URL: https://www.britannica.com/technology/graphical-user-interface>.

Wikipedia, "Widget (GUI)," Sep. 7, 2016. Retrieved from the internet <URL: https://en.wikipedia.org/w/index.php?title=Widget_(GUI)&oldid=738206274>.

Dror, et al., "From Query to Question in One Click: Suggesting Synthetic Questions to Searchers," International World Wide Web Conferences Steering Committee, May 13, 2013, pp. 391-401.

The Scientific Marketer, "Uplift Modelling FAQ", article date of Sep. 27, 2007, retrieved from http://scientificmarketer.com/2007/09/uplift-modelling-faq.html (Year: 2007).

Zadeh, Z.; "Probabilistic Modeling in Community-Based Question Answering Services," Dalhousie University, Halifax, Nova Scotia; Feb. 2012.

Podgorny, et al. "Real Time Detection and Intervention of Poorly Phrased Questions," CHI EA '15, Proceedings of the 33$^{rd}$ Annual ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 22, 2017]. Retrieved from the Internet: <URL: https://getsatisfaction.com/corp>.

Kumar et al., "Personalized Web search Using Browsing History and Domain Knowledge" International Conference on Issues and Challenges in Intelligent Computing Techniques (ICICT), IEEE 2014, pp. 493-497.

(56) References Cited

OTHER PUBLICATIONS

Wen et al., "Clustering user Queries of a Search Engine," Proceedings of the 10th International Conference on World Wide Web, pp. 162-168, ACM, 2001 (Year 2001).

* cited by examiner

METHOD AND SYSTEM FOR SEARCHING FOR AND NAVIGATING TO USER CONTENT AND OTHER USER EXPERIENCE PAGES IN A FINANCIAL MANAGEMENT SYSTEM WITH A CUSTOMER SELF-SERVICE SYSTEM FOR THE FINANCIAL MANAGEMENT SYSTEM

BACKGROUND

Financial management systems are valuable tools that provide services that were previously available only through interaction with a human professional, or that were painfully attempted by oneself. Prior to the advent of financial management systems, a user (e.g., a small business owner) would be required to consult with an accountant or bookkeeper for services, and the user would be limited, and potentially inconvenienced, by the office hours during which the professional was available for consultation. Furthermore, the user might be required to gather paper copies of all relevant records and travel to the professional's physical location to relay the information to the professional to obtain the professional's assistance. Beyond the inconveniences of scheduling and travel, the user would also be at the mercy of the professional's education, skill, personality, and varying moods. All of these factors resulted in a user who was vulnerable to: human error, variations in human ability, and variations in human temperament.

A financial management system can provide benefits that human professionals are hard-pressed to provide, such as: not having limited working hours, not being geographically limited, and not being subject to human error or variations in human ability or temperament. Small business owners are typically not accountants, nor do they want to be. Small business owners typically interact with business management software out of necessity, while simply wanting to return to the task of running their business. A financial management system enables users to receive accountant-like services, without the pain points associated with traditional interaction with professionals. To provide these services, however, the financial management system can often present seemingly numerous user experience pages, forms, and/or options that may be difficult to recall, find, and/or navigate while interacting with the financial management system.

Users who have difficulty finding or navigating to information may feel fear, uncertainty, and/or doubt about what they are doing or about what they are supposed to do. The users' feelings fear, uncertainty, and/or doubt can quickly turn into frustration and a lack of desire to continue trying. Feelings of fear, uncertainty, and/or doubt are inconsistent with satisfied/happy customers, and such feelings may cause customers to seek alternative solutions, ultimately resulting in the abandonment of use of a particular financial management system. Because financial management systems are adept at saving users time while providing feature-rich business and/or personal management solutions, it is beneficial for both the users and the service provider of the financial management system to facilitate searching and navigating to information in the financial management system.

Thus, there is a longstanding technical problem related to finding and navigating information in financial management systems.

SUMMARY

Embodiments of the present disclosure include a technical solution to the longstanding technical problem that is related to finding and navigating information in financial management systems. The technical solution includes a method and system for searching for and navigating to user content and other user experience pages in a financial management system with a customer self-service system for the financial management system. The customer self-service system provides incremental search results that are based on user behavior and/or user content within a financial management system, which enables a user to find any user content or search through within the financial management system, according to one embodiment. The user content includes, but is not limited to, financial transaction information (e.g., related to running a business, vendor transactions, buyer transactions, personal shopping transactions, etc.), personal financial information (e.g., related to managing a personal budget), and tax information, according to one embodiment. The customer self-service system provides the search results incrementally (i.e., as incremental search results), allowing the user to receive references to transactions or transaction details in real-time as the user provides search query terms for the customer self-service system, according to one embodiment. Incremental search results are search results that are generated for search query terms based on the various information a financial management system stores about a user, as a user enters (e.g., in real-time) the search query terms to formulate a search query to a customer self-service system, according to one embodiment. The incremental search results are specific to (the domain of) one or more particular financial management systems and may include automated suggestions for additional search query terms that are specific to searching one or more financial management systems, according to one embodiment.

The customer self-service system also facilitates navigation within the financial management system, according to one embodiment. If a user selects (e.g., with a mouse click, a stylus touch, a finger touch, a vocal command, etc.) one of the incremental search results, the customer self-service system navigates the user to the relevant user experience page within the financial management system, according to one embodiment. For example, if the selected incremental search result includes a reference to an invoice, the customer self-service system navigates the user to the user experience page used to create and/or track that invoice, according to one embodiment. As another example, if the selected incremental search result is a reference to creating or updating payroll in the financial management system, then the customer self-service system navigates the user to a user experience page that allows a user to create or update payroll information for the user's business. As a result, the customer self-service system facilitates searching transactions and navigating within a financial management system, according to one embodiment.

Providing domain-specific incremental search results (e.g., using search query terms from a partial or complete search query), in a results text box that is proximate to the search text box used to enter the search query terms, provides several benefits. Search engines generate revenue by mixing, mingling, or placing search results in the body of a webpage so that the search results are proximate to advertisements, even though it takes longer to find the search results and makes it more difficult to find the search results. By providing domain-specific incremental search results in a results text box that is proximate to the search text box, the customer self-service system enables a user to find the user's search results faster than embedding the incremental search results in the body of webpage, according to one embodiment. In mobile computing environments (e.g., tablet and/or smart phone user experiences), searching for transactions and navigating the financial management system is faster and can be performed from the search text box (e.g., search menu), instead of using the traditional techniques of exploring, expanding, and/or searching through a number of menus, according to one embodiment. By providing simplified (e.g., under a predetermined character count) incremental search results in a results text box that is proximate to the search text box, the customer self-service system helps the user easily understand and/or digest the content of the search results, according to one embodiment. By including incremental search results that are (or include) navigation links to sections of the financial management system, the customer self-service system increases the likelihood that the user receives the information that will/may satisfy the user's intent in forming a search query and that increases the likelihood that a user will be able to quickly and easily get to the content that the user may be searching for, according to one embodiment. By providing domain-specific incremental search results that are based on a partial search query, the customer self-service system helps the user answer the user's search query even before the customer finishes entering the search query, according to one embodiment. By providing domain-specific incremental search results that are based on a partial search query, the customer self-service system helps the user better formulate the user's search by seeing the potential incremental search results of the current search query terms, according to one embodiment.

The customer self-service system uses one or more of a variety of techniques for generating the incremental search results, according to one embodiment. The customer self-service system applies natural language processing techniques to the search query terms to determine the intent of the user, according to one embodiment. The customer self-service system determines one or more topics that are relevant to the search query terms, and returns user content (e.g., transactions, spending, tax information), navigation links, and/or other customer self-service content that is likely relevant (e.g., includes the same or similar topic(s)) to the determined one or more topics of the search query terms, according to one embodiment. The customer self-service system predicts one or more potential search queries that the user could formulate from the search query terms received, and returns user content (e.g., transactions, spending, tax information), navigation links, and/or other customer self-service content (e.g., help content) that is likely relevant to the predicted one or more complete search queries, according to one embodiment. In one embodiment, the customer self-service system performs incremental searches using social graphs to find transactions relevant to the user search intent (e.g. to find a buyer to send an invoice to).

These and other embodiments of the customer self-service system are discussed in further detail below.

Searching for and navigating to transactions and other user experience pages in a financial management system with a customer self-service system for the financial management system is a technical solution to a technical problem and is not an abstract idea for at least a couple of reasons. First, searching for and navigating to transactions and other user experience pages in a financial management system with a customer self-service system for the financial management system is not an abstract idea because it is a computing-centric technology that addresses a computing-centric problem of finding and navigating information using an electronic customer self-service system. Second, providing domain-specific and dynamic type ahead suggestions for search query terms with a customer self-service system for a tax return preparation system is not an abstract idea because it cannot be performed using pen and paper and cannot be performed by a human mind because the quantity of data that would have to be mentally processed is believed to be nearly humanly impossible.

Searching for and navigating to transactions and other user experience pages in a financial management system with a customer self-service system for the financial management system allows for significant improvement to the fields of user experience, self-service systems, customer service, customer retention, business management, financial management, and domain-specific search engines, according to one embodiment. The present disclosure adds significantly to the concept of content searching by providing domain-specific incremental search results for search query terms with a customer self-service system for one or more financial management systems because the customer self-service system: reduces the amount of time users spend searching for use content (e.g., transactions); reduces the amount of time users spend locating user content in a user experience page; assists users in formulating search queries for information that they are searching for; and reduces the amount of time users spend entering a search query and navigating to user experience pages in a financial management system, according to one embodiment. As a result, embodiments of the present disclosure allow for reduced use of processor cycles, memory, and power consumption, by reducing the time spent by users searching for and navigating to user content (and other customer self-service system content) and by reducing time spent by users to repeatedly search for user content or a user experience page in computing environments, according to one embodiment. Consequently, computing and communication systems implementing and/or providing the embodiments of the present disclosure are transformed into more operationally efficient devices and systems.

In addition to improving overall computing performance, searching for and navigating to user content and other user experience pages in a financial management system with a customer self-service system for the financial management system significantly improves the field of financial management systems, by reducing the amount of time that a user is removed from the operations tasks of running the user's business due to delays caused by trying to find transactions or particular user experience pages (e.g., to complete a task), according to one embodiment. Furthermore, by searching for and navigating to transactions and other user experience pages in a financial management system with a customer self-service system for the financial management system, the disclosed embodiments help maintain and/or build trust and therefore loyalty in the financial management system with which the customer self-service system is associated, which results in repeat customers, and reduced abandonment of use of the financial management system, according to one embodiment.

Figure 1A:
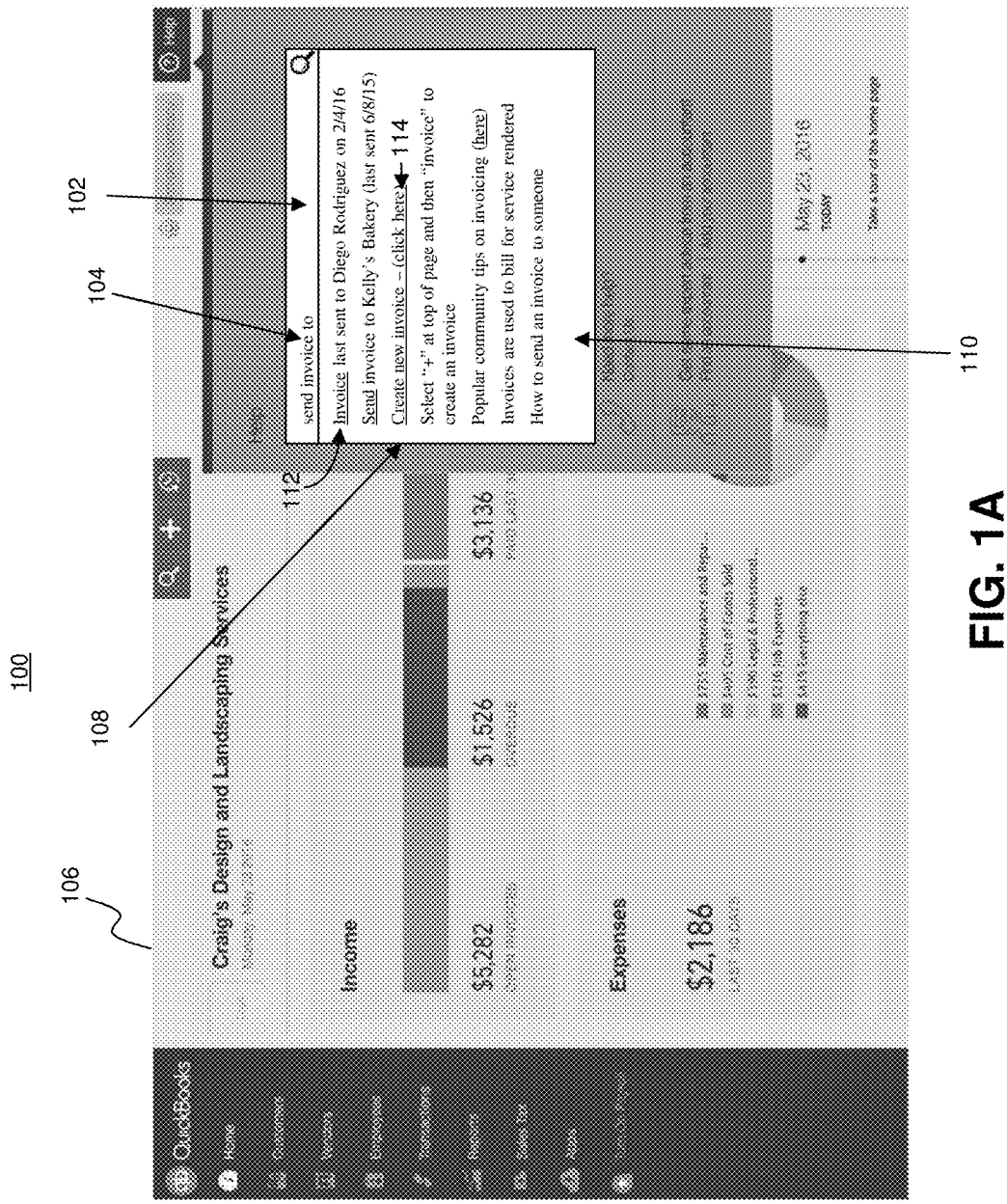
FIGS. 1A, 1B, and 1C are diagrams of user experience pages for searching for and navigating to user content and other user experience pages in a financial management system with a customer self-service system for the financial management system, in accordance with one embodiment.

Common reference numerals are used throughout the FIGs. and the detailed description to indicate like elements. One skilled in the art will readily recognize that the above FIGs. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs., which depict one or more exemplary embodiments. Embodiments may be implemented in many different forms and should not be construed as limited to the embodiments set forth herein, shown in the FIGs., and/or described below. Rather, these exemplary embodiments are provided to allow a complete disclosure that conveys the principles of the invention, as set forth in the claims, to those of skill in the art.

The INTRODUCTORY SYSTEM, USER EXPERIENCE, ARCHITECTURE, and PROCESS sections herein describe systems and processes suitable for searching for and navigating to user content and other user experience pages in a financial management system with a customer self-service system for the financial management system, according to various embodiments.

Introductory System

Financial management system users sometimes abandon in-product search and self-service services when finding information and/or navigating a user experience takes longer than expected and/or is difficult. When a business owner (e.g., a small business owner) sets aside time to manage the business by creating/sending invoices, bills, receipts, payroll, tax submissions, etc., the business owner wants to efficiently complete the task in order to get back to substantive business operations. When a question arises or if particular information is sought, "time is money." That is, the longer it takes to find the answer or information, the more the business owner may incur lost opportunities (opportunity costs). Gathering paperwork, entering data, and trying to understand the jargon that is specific to accountants (account tracking/balancing) can hardly be avoided while operating one's business. However, natural feelings of frustration, uncertainty, and/or doubt can be amplified, when people are unable to find information or user experience pages that they need to complete a particular task. Embodiments of the present disclosure predict/determine users' likely questions based on partial search queries (e.g., one or more search query terms), based on user content data, and/or based on user profile data, and provide brief answers near (e.g., below) the search query text box, in real-time (e.g., as the users enter their search queries), according to one embodiment. In other words, a customer self-service system provides incremental search results right next to the search text box, as the users enter their search queries, according to one embodiment. The brief answers include user content (e.g., transaction records, budget goals, invoice details, tax return information, etc.), customer self-service system content (e.g., short answers to help-related questions), and navigation links to enable the user to conveniently digest information and navigate to other areas (user experience pages) within the financial management system and/or within the customer self-service system, according to one embodiment. With each addition or removal of a search query term, the customer self-service system modifies the incremental search results displayed for the user, to help the user quickly and conveniently find and understand the answer to their partial, potential, or completed search query, according to one embodiment.

Embodiments of the present disclosure include a method and system for searching for and navigating to user content and other user experience pages in a financial management system with a customer self-service system for the financial management system. The customer self-service system provides incremental search results that are based on user behavior and/or user content within a financial management system, which enables a user to find any user content or search within the financial management system, according to one embodiment. The user content includes, but is not limited to, financial transaction information, personal financial information, and tax information, according to one embodiment. The customer self-service system provides the search results incrementally (i.e., as incremental search results), allowing the user to receive references to transactions or transaction details in real-time as the user provides search query terms for the customer self-service system, according to one embodiment. Incremental search results are search results that are generated for search query terms based on the various information a financial management system stores about a user, as a user enters (e.g., in real-time) the search query terms to formulate a search query to a customer self-service system, according to one embodiment. The incremental search results are specific to (the domain of) one or more particular financial management systems and may include automated suggestions for additional search query terms that are specific to searching one or more financial management systems, according to one embodiment.

The customer self-service system also facilitates navigation within the financial management system, according to one embodiment. If a user selects (e.g., with a mouse click, a stylus touch, a finger touch, a vocal command, etc.) one of the incremental search results, the customer self-service system navigates the user to the relevant user experience page within the financial management system, according to one embodiment. For example, if the selected incremental search result includes a reference to an invoice, the customer self-service system navigates the user to the user experience page used to create and/or track that invoice, according to one embodiment. As another example, if the selected incremental search result is a reference to creating or updating payroll in the financial management system, then the customer self-service system navigates the user to a user experience page that allows a user to create or update payroll information for the user's business. As a result, the customer self-service system facilitates searching transactions and navigating within a financial management system, according to one embodiment.

Providing domain-specific incremental search results (e.g., using search query terms from a partial or complete search query), in a results text box that is proximate to the search text box used to enter the search query terms, provides several benefits. Search engines generate revenue by mixing, mingling, or placing search results in the body of a webpage so that the search results are proximate to advertisements, even though it takes longer to find the search results and makes it more difficult to find the search results. By providing domain-specific incremental search results in a results text box that is proximate to the search text box, the customer self-service system enables a user to find the user's search results faster than embedding the incremental search results in the body of webpage, according to one embodiment. In mobile computing environments (e.g., tablet and/or smart phone user experiences), searching for transactions and navigating the financial management system is faster and can be performed from the search text box (e.g., search menu), instead of using the traditional techniques of exploring, expanding, and/or searching through a number of menus, according to one embodiment. By providing simplified (e.g., under a predetermined character count) incremental search results in a results text box that is proximate to the search text box, the customer self-service system helps the user easily understand and/or digest the content of the search results, according to one embodiment. By including incremental search results that are (or include) navigation links to sections of the financial management system, the customer self-service system increases the likelihood that the user receives the information that will/may satisfy the user's intent in forming a search query and that increases the likelihood that a user will be able to quickly and easily get to the content that the user may be searching for, according to one embodiment. By providing domain-specific incremental search results that are based on a partial search query, the customer self-service system helps the user answer the user's search query even before the customer finishes entering the search query, according to one embodiment. By providing domain-specific incremental search results that are based on a partial search query, the customer self-service system helps the user better formulate the user's search by seeing the potential incremental search results of the current search query terms, according to one embodiment.

The customer self-service system uses one or more of a variety of techniques for generating the incremental search results, according to one embodiment. The customer self-service system applies natural language processing techniques to the search query terms to determine the intent of the user, according to one embodiment. The customer self-service system determines one or more topics that are relevant to the search query terms, and returns user content (e.g., transactions, spending, tax information), navigation links, and/or other customer self-service content that is likely relevant (e.g., includes the same or similar topic(s)) to the determined one or more topics of the search query terms, according to one embodiment. The customer self-service system predicts one or more potential search queries that the user could formulate from the search query terms received, and returns user content (e.g., transactions, spending, tax information), navigation links, and/or other customer self-service content (e.g., help content) that is likely relevant to the predicted one or more complete search queries, according to one embodiment.

The customer self-service system provides a variety of content in the incremental search results, according to one embodiment. The incremental search results include, but are not limited to, definitions of terms (e.g., definitions of tax jargon), frequently asked questions ("FAQs"), acronym definitions, use content (e.g., transaction records, invoice history for a customer of the user, etc.), a form number, a book keeping or tax-specific date, answers to potential search queries, search query suggestions, and navigation links to user experience pages for one or more of the incremental search results, according to one embodiment.

As used herein, the term system (e.g., customer self-service system, tax return preparation system, or other software system) includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of systems include, but are not limited to the following: TurboTax® available from Intuit, Inc. of Mountain View, Calif.; TurboTax® Online available from Intuit, Inc. of Mountain View, Calif.; QuickBooks®, available from Intuit, Inc. of Mountain View, Calif.; QuickBooks® Online™ (QBO™), available from Intuit, Inc. of Mountain View, Calif.; Mint®, available from Intuit, Inc. of Mountain View, Calif.; Mint® Online, available from Intuit, Inc. of Mountain View, Calif.; and/or various other systems discussed herein, and/or known to those of skill in the art at the time of filing, and/or as developed after the time of filing. In one embodiment, data collected from users of TurboTax® and/or TurboTax® Online is not used with other service provider systems, such as Mint® or QuickBooks®.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system", "computing entity", and/or "computing environment" can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access and use, a given system as that system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the system in the production environment such as a data center, a cloud computing environment, a dedicated hosting environment, and/or one or more other computing environments in which one or more assets used by the application in the production environment are implemented; one or more computing systems or computing entities used to implement at least part of the system in the production environment; one or more virtual assets used to implement at least part of the system in the production environment; one or more supervisory or control systems, such as hypervisors, or other monitoring and management systems used to monitor and control assets and/or components of the production environment; one or more communications channels for sending and receiving data used to implement at least part of the system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the system in the production environment; one or more databases used to store data in the production environment; one or more internal or external services used to implement at least part of the system in the production environment; one or more backend systems, such as backend servers or other hardware used to process data and implement at least part of the system in the production environment; one or more modules/functions used to implement at least part of the system in the production environment; and/or any other assets/components making up an actual production environment in which at least part of the system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the system.

In various embodiments, one or more cloud computing environments are used to create, and/or deploy, and/or operate at least part of the system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets within one or more cloud or traditional computing environments.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features and elements provided or displayed to the user such as, but not limited to the following: data entry fields, question quality indicators, images, backgrounds, avatars, highlighting mechanisms, icons, buttons, controls, menus and any other features that individually, or in combination, create a user experience, as discussed herein, and/or as known in the art at the time of filing, and/or as developed after the time of filing.

As used herein, the terms "user experience page" and "user experience screen" are interchangeable in meaning and represent a changeable rendering or view of content that is provided to a user in the user experience display, according to one embodiment.

As used herein, the term "user experience" includes not only a search query creation process, an incremental search results receipt process, a user session, interview process, interview process questioning, and/or interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the disclosed methods and systems described herein, and/or a legal guardian of person and/or entity that interfaces with, and/or to whom information is provided by, the disclosed methods and systems described herein, and/or an authorized agent of any party and/or person and/or entity that interfaces with, and/or to whom information is provided by, the disclosed methods and systems described herein. For instance, in various embodiments, a user can be, but is not limited to, a person, a commercial entity, an application, a service, and/or a computing system.

As used herein, the term "predictive model" is used interchangeably with "analytics model" denotes one or more individual or combined algorithms or sets of equations that describe, determine, and/or predict characteristics of or the performance of a datum, a data set, multiple data sets, a computing system, and/or multiple computing systems. Analytics models or analytical models represent collections of measured and/or calculated behaviors of attributes, elements, or characteristics of data and/or computing systems.

As used herein, the term "incremental search results" includes search results that are generated for search query terms based on the various information one or more (business, personal, and/or tax-related) financial management systems have for a user, as a user enters (e.g., in real-time) search query terms as part of a search query to a customer self-service system that supports the one or more financial management systems, according to one embodiment. The incremental search results are specific to the domain of financial management systems and may include automated suggestions for additional search query terms that are specific to searching the one or more financial management systems, according to one embodiment. Because the incremental search results are specific to the domain of the one or more financial management systems, as used herein, "incremental search results" is used interchangeably with "domain-specific incremental search results". The incremental search results are search results for a partial, potential, and/or complete search query that is based on the received search query terms and based on user data (e.g., user profile data), according to one embodiment. The incremental search results are search results for one or more potential search queries that a user could formulate from the search query terms that have been received by the customer self-service system, according to one embodiment.

As used herein, the term "incremental search content" includes one or more (usually multiple) incremental search results combined with suggested potential search queries, according to one embodiment. Although not technically correct, for simplicity, "incremental search results" may be used to reference "potential search queries" (e.g., suggested or possible search queries) that are based on the received search query terms, according to one embodiment.

As used herein the term "search text box" denotes a text box, data entry box, and/or data field in which a user enters search query terms, according to one embodiment.

As used herein the term "results text box" denotes a text box, data entry box, and/or data field in which the incremental search results are displayed, according to one embodiment. The results text box may be displayed in the form of a drop-down menu that appears below (or otherwise proximate to) a search text box, according to one embodiment.

As used herein the term "user content" includes, but is not limited to, financial transaction information (e.g., from a business financial management system), personal financial information (e.g., from a personal financial management system), and tax information (e.g., from a tax return preparation financial management system), according to one embodiment.

User Experience

Figure 1B:
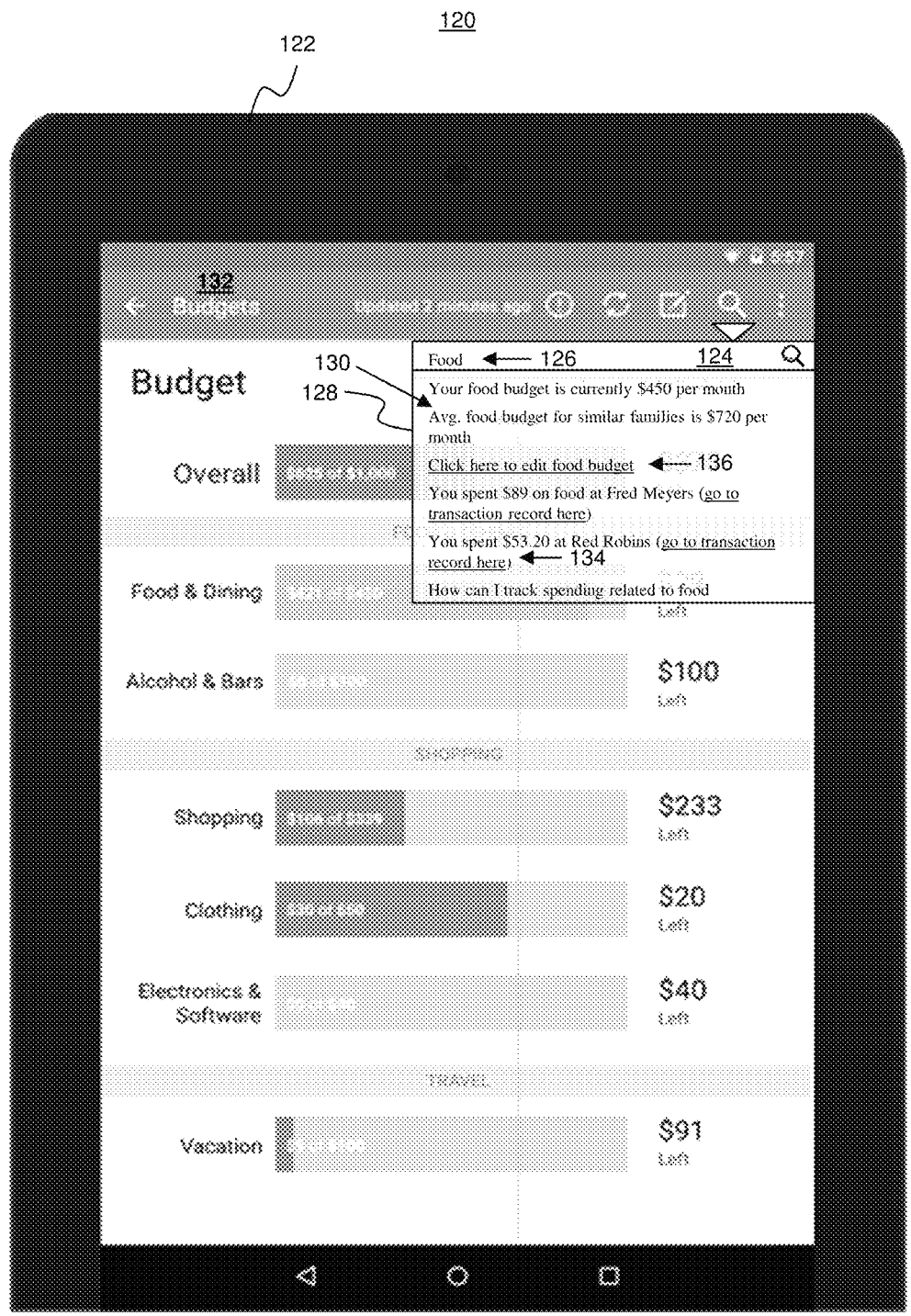
Figure 1C:
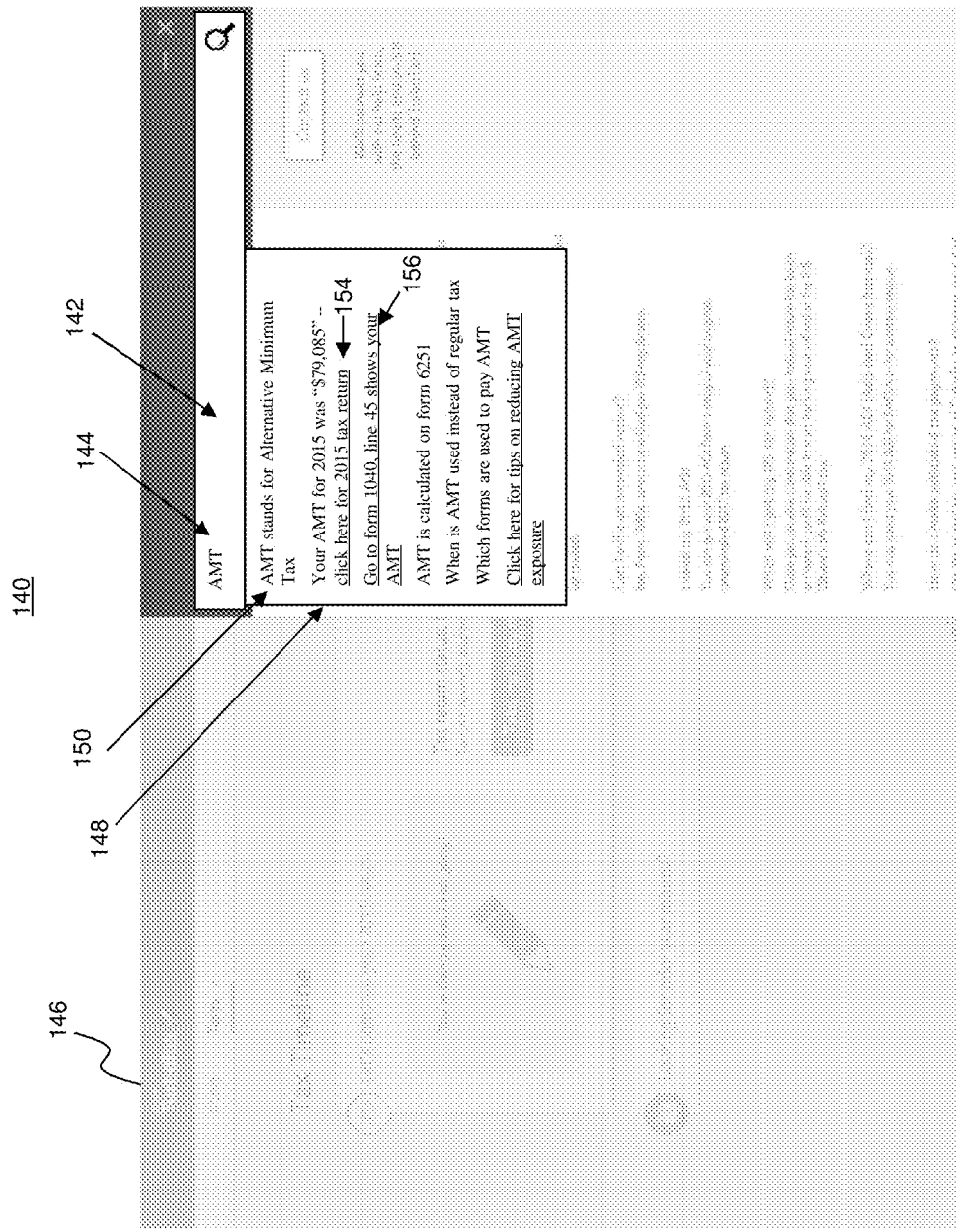

FIGS. 1A, 1B, and 1C are examples of user experience pages that can be used by a customer self-service system to provide financial management system-based incremental search results to a user, to reduce the time and difficultly associated with searching for user content (e.g., transaction records) and navigating to various user experience pages within a financial management system, according to one embodiment. FIG. 1A illustrates a user experience display 100, which includes a search text box 102 that is used to receive search query terms 104 from a user, according to one embodiment. The search text box 102 is provided by a standalone customer self-service system (e.g., QuickBooks® Online Support, Mint® Help, TurboTax® Support™, and/or TurboTax AnswerXchange® of Intuit, Inc. of Mountain View, Calif.), which is configured to support one or more financial management systems, according to one embodiment. In another embodiment, the search text box 102 is integrated into part of a user experience page 106 of a financial management system (e.g., QuickBooks®, Mint®, and/or TurboTax® Online™ of Intuit, Inc. of Mountain View, Calif.), according to one embodiment.

The user experience display 100 includes a results text box 108 that is a user experience element in which the customer self-service system displays incremental search content 110, according to one embodiment. The results text box 108 is a drop-down menu that is located near, proximate, and/or adjacent to the search text box 102, according to one embodiment. The search text box 102 is located in an upper region of the user experience display 100, and the results text box 108 is located adjacent to and below the search text box 102, according to one embodiment. The search text box 102 is located in a lower region of the user experience display 100, and the results text box 108 is located above the search text box 102, according to one embodiment. The results text box 108 is rendered on top of or over other content (e.g., financial management system content) that is provided in the user experience page 106, according to one embodiment. The results text box 108 is overlaid on top of other content that is provided in the user experience page 106, in such a manner that it is apparent that there is additional content at a location on the user experience page 106 that appears to be beneath the results text box 108 (e.g., by making the results text box 108 partially transparent), according to one embodiment.

The customer self-service system populates the results text box 108 with incremental search content 110 that is specific to one or more financial management systems, according to one embodiment. The incremental search content 110 includes a plurality of incremental search results, with each of the incremental searches results being displayed on a different line within the results text box 108, according to one embodiment. The incremental search content 110 includes, but is not limited to, definitions of the search query terms 104 that are related to personal, business, and/or tax-related financial management systems, definitions and explanations of acronyms of the search query terms 104 that are related to personal, business, and/or tax-related financial management systems, user content (e.g. transaction records and/or user profile data) that are associated with a user's use of personal, business, and/or tax-related financial management systems, financial management system forms (e.g., receipts, invoices, pay stubs, etc.) that are associated with the search query terms 104, explanations of how the search query terms are or can be used by the personal, business, and/or tax-related financial management systems, suggestions for potential search queries that are related to financial management systems and can be formulated from the search query terms 104, answers to potential search queries that may be formulated from the search query terms 104 (even if the user has not entered complete versions of potential search queries), and/or hyperlinks to user experience pages that provides more information for any of the incremental search results, according to one embodiment. To provide answers to potential search queries, the customer self-service system determines the potential search queries that can be formulated from the search query terms 104, does not necessarily display the potential search queries, but provides/displays the answers to the potential search queries as incremental search results of the incremental search content 110, according to one embodiment. The number of incremental search results included in the incremental search content 110 is limited to 5, 10, 20, or some other predetermined or dynamically determined number, to facilitate digestion/readability of the incremental search content 110 by users, according to one embodiment.

The incremental search content 110 includes character limited incremental search results, according to one embodiment. For example, each of the incremental search results are limited to, for example, 50 characters, according to one embodiment. Other predetermined or dynamically determined character limits can be used, but the customer self-service system applies a character limit to the incremental search results of the incremental search content 110 in order to reduce the effort used by a user in finding, reading, interpreting, and/or understanding the incremental search content 110, according to one embodiment.

The incremental search content 110 includes incremental search results that have topics that are the same as (or similar to) the search query terms 104 received from the user with the search text box 102, according to one embodiment. For example, if the search query terms 104 are related to the topic "invoice", then the incremental search content 110 will include incremental search results that also have the topic of invoice, according to one embodiment. Although the customer self-service system can use a topic-based search algorithm, the customer self-service system can also use other search algorithms to identify content that is stored by the customer self-service system that is responsive to a partial, potential, and such or complete search query provided by the user, according to one embodiment.

The incremental search content 110 includes incremental search results that are answers to potential search queries that the user may be formulating using search query terms 104, according to one embodiment. In other words, the customer self-service system uses the received search query terms 104 to predict potential search queries that the user is likely to formulate with the search query terms 104, and provides incremental search content 110 that are answers to the potential search queries, according to one embodiment. Using the example illustrated in the user experience display 100 of FIG. 1A, the customer self-service system populates the incremental search content 110 in response to determining that the search query terms 104 (e.g., invoice) are likely to be used by the user to formulate one or more questions such as "when did I send an invoice to Diego Rodriguez?"; "I want to send an invoice to Kelly's bakery?"; "I want to send a new invoice"; "How do I create an invoice?"; "I want to learn more about sending invoices"; and "What are invoices?", according to one embodiment. The customer self-service system can also populate the incremental search content 110 with suggested potential search queries (in response to receipt of the search query terms 104), such as "How to send an invoice to someone." In other words, the customer self-service system uses the search query terms 104 to determine which search queries the user is likely to formulate, and to provide those search queries and/or to provide answers to those search queries in the results text box 108, according to one embodiment. As discussed in more detail below, the potential search queries are determined by the customer self-service system at least partially based on the user content (e.g., transaction or navigation history within the financial management system) that is stored by the financial management system and/or the customer self-service system for the user and/or at least partially based on user profile data that is generated based on user interactions with the financial management system and/or with the customer self-service system, according to one embodiment.

The user experience display 100 also provides navigation links to at least some of the incremental search results, to enable the user to navigate to various other user experience pages within the financial management system, according to one embodiment. The customer self-service system provides a navigation link 112, such as a hyperlink, that is embedded or integrated into at least one of the words or terms in an incremental search result, according to one embodiment. The navigation link 112 is selectable (e.g., with a stylus, finger, a mouse, with voice command, etc.) by the user, and the customer self-service system navigates the user from the results text box 108 to another user experience page in response to detecting selection of the navigation link 112, according to one embodiment. As an example, the customer self-service system associates navigation link 112 with a user experience page identifier for the invoice since to Diego Rodriguez on Feb. 4, 2016, according to one embodiment. The customer self-service system provides a navigation link 114 embedded or integrated into an entire incremental search result, according to one embodiment. As an example, customer self-service system associates the navigation link 114 with a user experience page identifier and/or user experience page that enables the user to perform a particular action that is referenced by the incremental search result (e.g., to create a new invoice), according to one embodiment. The navigation links provided by the customer self-service system are also configured to route a user to tutorials, help pages, and community-provided information (crowd-sourced answers), according to one embodiment.

FIG. 1B illustrates a user experience display 120, which illustrates an example of displaying incremental search results in a mobile environment for a customer self-service system that supports a financial management system (e.g., a personal financial management system, such as Mint® of Intuit, Inc. of Mountain View, Calif.), according to one embodiment. In addition to the many other advantages described herein, the disclosed embodiments of providing domain-specific incremental search results improves the usability/functionality of searching for content on a mobile device. Mobile computing devices (e.g., smart phones, tablets, etc.) typically allow users to enter text for search queries using keyboards, styluses, and other text input devices. However, entering text in a mobile device is typically slower and more tedious and using a traditional keyboard. As result, providing domain-specific incremental search results based on partial search queries and/or potential search queries, which are extrapolated from limited quantities of search query text, enable users to interact with, search, and/or navigate mobile computing devices with the efficiency and thoroughness that is difficult to achieve without the assistance of a full-size keyboard and mouse. Accordingly, the disclosed embodiments of providing domain specific incremental search results improves the fields of mobile computing device operations, mobile computing device user experience design, and mobile computing device content searching, according to one embodiment.

The user experience display 120 is displayed on a mobile computing device 122, according to one embodiment. The user experience display 120 also includes a search text box 124 that is used to receive search query terms 126 from a user, and the results text box 128 that is used to display incremental search content 130 in response to the search query terms 126, according to one embodiment. A user experience page 132 includes an example content for a personal financial management system (e.g., Mint® of Intuit, Inc. of Mountain View, Calif.) that supports users in maintaining, tracking, and improving personal finances, according to one embodiment.

The user experience display 120 also provides navigation links to at least some of the incremental search results, to enable the user to navigate to various other user experience pages within the financial management system, according to one embodiment. The customer self-service system provides a navigation link 134, such as a hyperlink, that is embedded, integrated into, and/or appended to at least one of the words or terms in an incremental search result, according to one embodiment. The navigation link 134 is selectable (e.g., with a stylus, finger, a mouse, with voice command, etc.) by the user, and the customer self-service system navigates the user from the results text box 128 to another user experience page in response to detecting selection of the navigation link 134, according to one embodiment. As an example, the customer self-service system associates navigation link 134 with a user experience page identifier for a food purchase/transaction at a restaurant Red Robin®, according to one embodiment. The customer self-service system provides a navigation link 136 embedded or integrated into an entire incremental search result, according to one embodiment. As an example, customer self-service system associates the navigation link 136 with a user experience page identifier and/or user experience page that enables the user to perform a particular action that is referenced by the incremental search result (e.g., to edit the user's food budget), according to one embodiment. The navigation links provided by the customer self-service system can also be configured to route a user to tutorials, help pages, and community-provided information (crowd-sourced answers), according to one embodiment.

FIG. 1C illustrates a user experience display 140, which illustrates an example of displaying incremental search results for a customer self-service system that supports a financial management system (e.g., a tax return preparation financial management system, such as TurboTax® Online™ of Intuit, Inc. of Mountain View, Calif.), according to one embodiment. The user experience display 140 includes a search text box 142 that is used to receive search query terms 144 from a user, and a results text box 148 that is used to display incremental search content 150 in response to the search query terms 144, according to one embodiment. A user experience page 146 includes an example content for a tax return preparation financial management system (e.g., TurboTax® Online™ of Intuit, Inc. of Mountain View, Calif.) that supports users in preparing and filing state and federal tax returns, according to one embodiment.

The user experience display 140 also provides navigation links to at least some of the incremental search results, to enable the user to navigate to various other user experience pages within the financial management system, according to one embodiment. The customer self-service system provides a navigation link 154, such as a hyperlink, that is embedded, integrated into, and/or appended to at least one of the words or terms in an incremental search result, according to one embodiment. The navigation link 154 is selectable (e.g., with a stylus, finger, a mouse, with voice command, etc.) by the user, and the customer self-service system navigates the user from the results text box 148 to another user experience page in response to detecting selection of the navigation link 154, according to one embodiment. As an example, the customer self-service system associates navigation link 154 with a user experience page identifier for a user's 2015 tax return to allow a user to review the user's AMT (alternative minimum tax), according to one embodiment. The customer self-service system provides a navigation link 156 embedded or integrated into an entire incremental search result, according to one embodiment. As an example, customer self-service system associates the navigation link 156 with a user experience page identifier and/or user experience page that enables the user to go to a specific form where information for a specific tax-related calculation is displayed for the user, according to one embodiment. The navigation links provided by the customer self-service system can also be configured to route a user to tutorials, help pages, and community-provided information (e.g., tips on reducing AMT exposure), according to one embodiment.

For the user experience displays 100, 120, 140, several advantages can be achieved by displaying the incremental search content 110, 130, 150 in the results text box 108, 128, 148, in response to the search query terms 104, 126, 144 received by a customer self-service system. As examples of advantages, the user can receive answers to the user's questions before the user finishes formulating the question, the user can receive assistance in formulating the user's questions and therefore save the time of formulating the question that the user had, the user can quickly find the answer to the user's question without searching through one or more pages of text, the user can quickly read and understand the answer to the user's question, the user can quickly find the question to the user's answer, and the user can receive answers to the user's questions that include the user's own content and/or personal information, according to one embodiment. The user can more efficiently and thoroughly search through and navigate financial management systems from mobile and non-mobile computing devices, according to one embodiment. These several advantage are examples of how the disclosed embodiments resolve/address the deficiencies of traditional techniques for providing search results.

Architecture

Figure 2A:
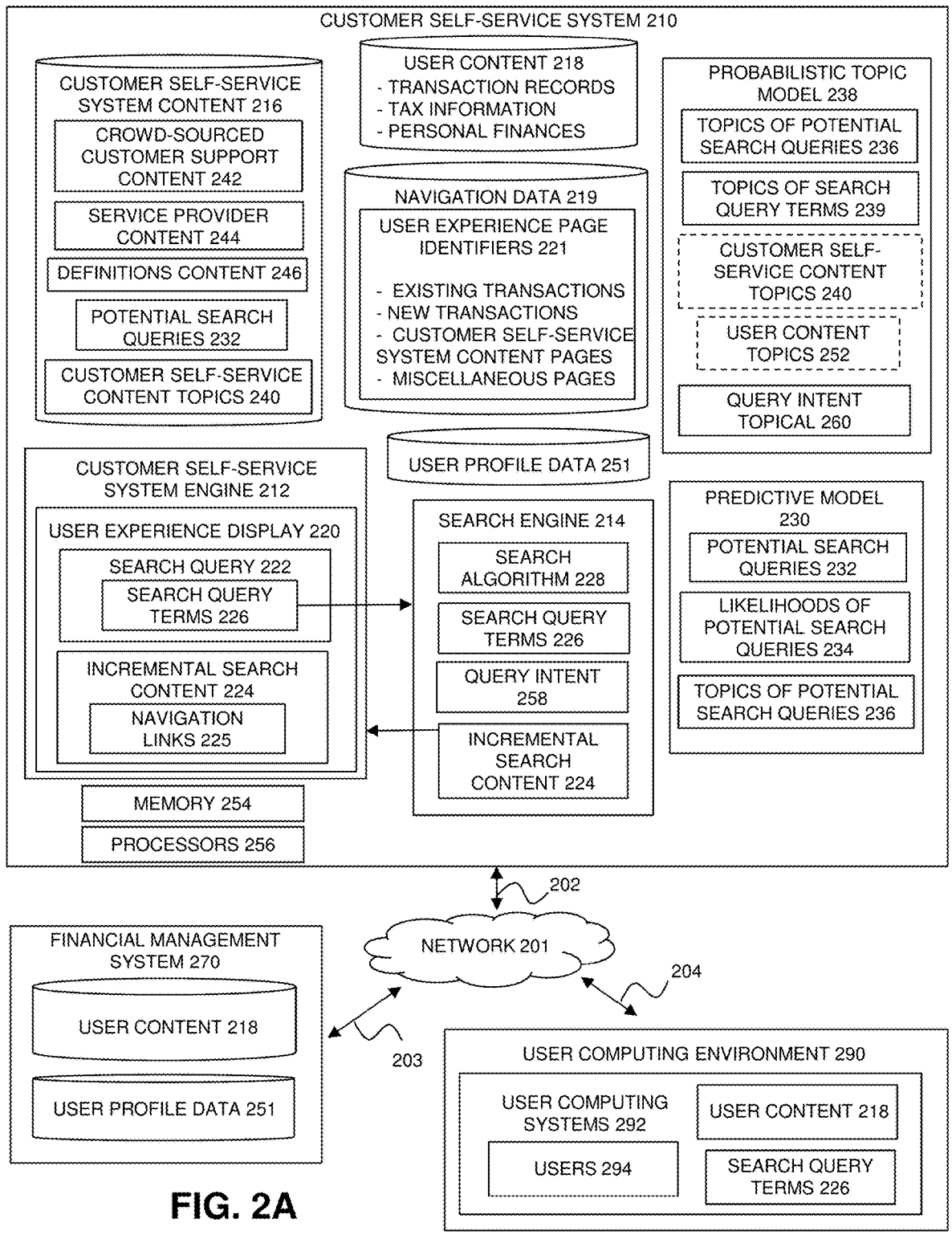
FIGS. 2A and 2B are block diagrams of an architecture for searching for and navigating to user content and other user experience pages in a financial management system with a customer self-service system for the financial management system, in accordance with one embodiment.
Figure 2B:
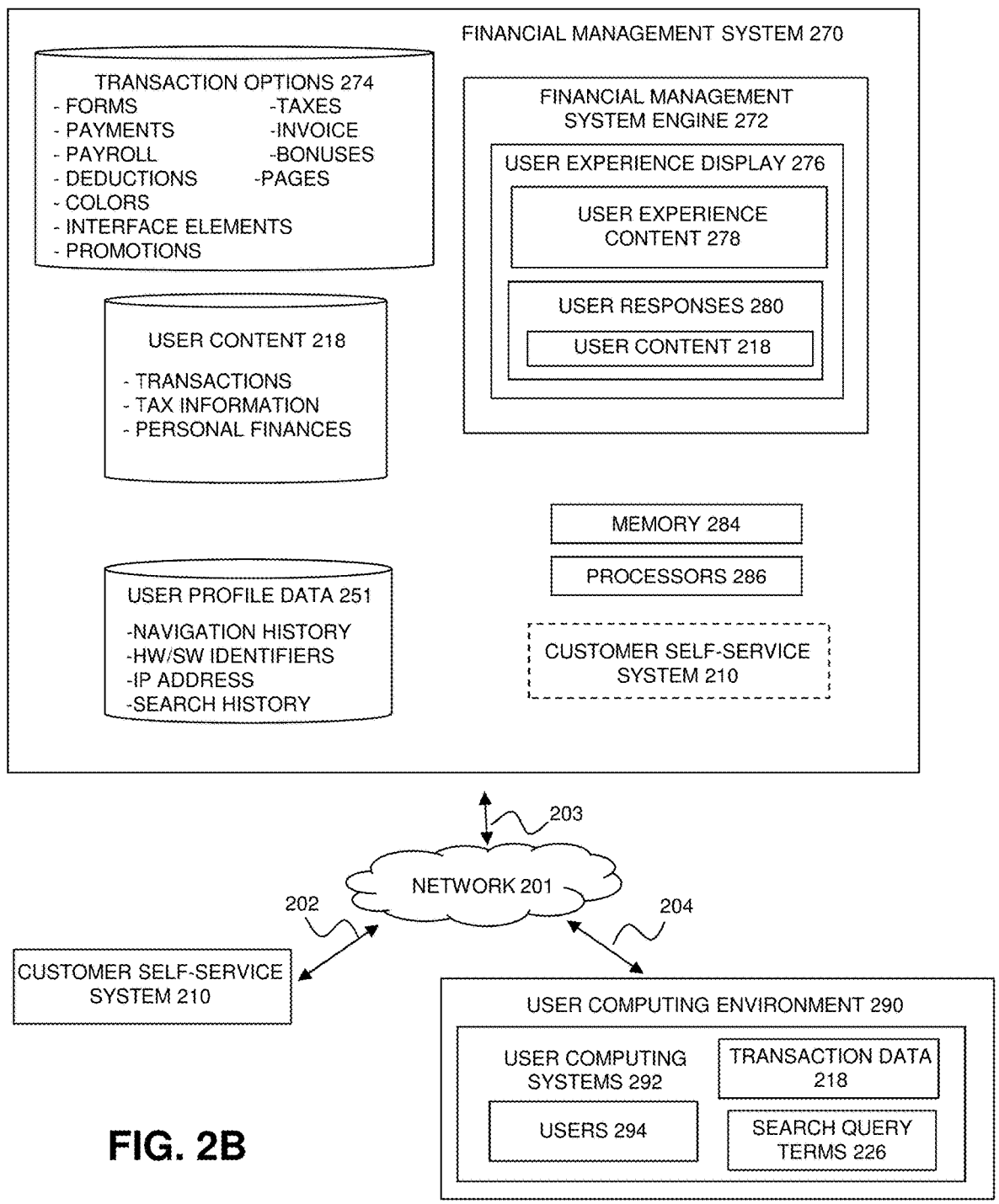

FIGS. 2A and 2B illustrates an example block diagram of a production environment 200 for searching for and navigating to user content and other user experience pages in a financial management system with a customer self-service system for the financial management system, according to one embodiment. According to various embodiments, the financial management is a business financial management system, a personal financial management system, a business accounting system, a tax return preparation financial management system, and/or combination of one or more particular types of financial management systems. The production environment 200 includes a customer self-service system 210, a financial management system 270, and a user computing environment 290 that are communicatively coupled through a network 201, according to one embodiment. The customer self-service system 210 is hosted in a computing environment, according to one embodiment. The financial management system 270 is hosted in a computing environment, according to one embodiment. The customer self-service system 210, the financial management system 270, and the user computing environment 290 are communicatively coupled to each other through the network 201 through one or more communications channels 202, 203, and 204, according to one embodiment.

The customer self-service system 210 includes a customer self-service system engine 212, a search engine 214, customer self-service system content 216, user content 218 and navigation data 219, for providing domain-specific incremental search results and navigation links that are responsive to receipt of search query terms with the customer self-service system 210 for the financial management system 270, according to one embodiment. The customer self-service system engine 212 receives search query terms from users of the customer self-service system 210, and provides incremental search content (inclusive of navigation links) to the users in response to receipt of the search query terms, according to one embodiment. The customer self-service system 210 uses the search engine 214 to search for the incremental search content based on the search query terms, according to one embodiment. The search engine 214 identifies the incremental search content at least partially based on the search query terms, at least partially based on the user content 218, the navigation data 219 and/or at least partially based on user profile data 251, according to one embodiment. The search engine 214 populates the incremental search content from the customer self-service system content 216, from the user content 218, and/or from navigation data 219, based on the search query terms, according to one embodiment.

The customer self-service system engine 212 and/or the customer self-service system 210 provide the user experience display 220 for receiving a search query 222 from a user and for providing incremental search content 224 and navigation links 225 to the user to answer the user's query and/or to facilitate navigation to additional user experience pages, according to one embodiment. The user experience display 220 includes, but is not limited to, text boxes, menus, buttons, avatars, audio/video content, hyperlinks, and/or other user experience elements to receive the search query 222 and to provide the incremental search content 224 and the navigation links 225, according to one embodiment. The user experience display 220 includes a search text box in which the user formulates the search query 222 with one or more search query terms 226, according to one embodiment. The user experience display 220 includes a results text box in which the incremental search content 224 (e.g., a plurality of incremental search results) is displayed, according to one embodiment. The results text box is positioned proximate (e.g., adjacent) to the search text box in the user experience display 220 to enable the user to conveniently find, read, understand, and select the incremental search content 224 and/or the navigation links 225, if the user seeks further information about the incremental search content 224, according to one embodiment.

The search engine 214 and/or the customer self-service system 210 includes a search algorithm 228 that is used to define the incremental search content 224 and the navigation links 225, according to one embodiment. The search engine 214 receives the search query terms 226 from the customer self-service system engine 212 and applies the search query terms 226 to the search algorithm 228 to generate/define the incremental search content 224 and the navigation links 225, according to one embodiment.

The search engine 214 uses the search algorithm 228 to search the customer self-service system content 216 to identify which portions of the customer self-service system content 216 to include in the incremental search content 224, for display/presentation to the users, according to one embodiment. In one embodiment, the search algorithm 228 includes probabilistic topics model, query clustering, query de-duplication, Latent Dirichlet allocation algorithm, or one or more other database or content searching algorithms for matching the search query terms 226 with portions of the customer self-service system content 216, according to one embodiment. In one embodiment, the search algorithm 228 determines potential and/or likely options for the search query 222 based on one or more of the search query terms 226 and includes the potential and/or likely options of the search query 222 in the incremental search content 224, to reduce the time the user spends formulating the search query 222, according to one embodiment. The potential and/or likely options of the search query 222 are potential search queries 232, which may be stored in the customer self-service system content 216, according to one embodiment. The search algorithm 228 identifies answers to the potential search queries 232 and provides those answers in the incremental search content 224, according to one embodiment. The search algorithm 228 identifies customer self-service system content 216 that includes the same topic as one or more received search query terms 226 and provides (to the user) the customer self-service system content 216 that has the same topic as the search query terms 226, according to one embodiment. In one embodiment, the search engine 214 and/or the search algorithm uses the user profile data 251 in combination with the user content 218 to define the potential search queries 232, to define the incremental search content 224, and/or to select which customer self-service system content 216 to provide to a user in response to the search query terms 226. The user profile data 251 includes, but is not limited to the user's navigation or browser history within the financial management system 270, clickstream data for the user, estimated income level of the user, estimated education level of the user, user-experience with the financial management system 270 (e.g., a repeat versus first-time user), Internet Protocol ("IP") address characteristics (e.g., library, corporation, residential, foreign IP address, etc.), and hardware and/or software identifiers for the user (e.g., operating system, brand of computing system, etc.), according to one embodiment.

The search engine 214 uses the search algorithm 228 to search the customer self-service system content 216 to identify which portions of the user content 218 to include in the incremental search content 224, for display/presentation to the users, according to one embodiment. In one embodiment, the search algorithm 228 includes probabilistic topics model, query clustering, query de-duplication, Latent Dirichlet allocation algorithm, or one or more other database or content searching algorithms for matching the search query terms 226 with portions of the user content 218, according to one embodiment. In one embodiment, the search algorithm 228 determines potential and/or likely options for the search query 222 based on one or more of the search query terms 226 and/or based on the potential search queries 232, according to one embodiment. The search algorithm 228 identifies answers to the potential search queries 232 and provides those answers in the incremental search content 224, according to one embodiment. The search algorithm 228 identifies user content 218 that includes the same topic as one or more received search query terms 226 and provides (to the user) the user content 218 that has the same topic as the search query terms 226, according to one embodiment. In one embodiment, the search engine 214 and/or the search algorithm uses the user profile data 251 in combination with the user content 218 to define the potential search queries 232, to define the incremental search content 224, and/or to select which user content 218 to provide to a user in response to the search query terms 226. In one embodiment, the customer self-service system 216 and/or the search engine 214 uses social graphs to find transactions relevant to the user search intent (e.g. to find a buyer to send an invoice to). The social graphs include nodes and edges representing different parties (e.g., people, businesses, organizations) and relationships between the different parties, according to one embodiment. The customer self-service system 216 and/or the search engine 214 traverses edges (e.g., relationships) of the social graph, at least partially based on the search query terms 226 (and/or the corresponding search intent of the user), to identify user content 218 (e.g., transactions) that are relevant to the search query terms 226 (and/or the corresponding search intent of the user), according to one embodiment.

The customer self-service system 210, the customer self-service system engine 212, and/or the search engine 214 uses the navigation data 219 to identify and define navigation links 225 to include or appended to the incremental search content 224, according to one embodiment. The search engine 214 uses the search algorithm 228 to search the navigation data 219 to identify user experience page identifiers 221 that are associated with the user content 218 and/or the customer self-service system content 216 that the search algorithm 228 identifies as relevant to the search query terms 226, according to one embodiment. The user experience page identifiers 221 enable the search engine 214 and/or the customer self-service system engine 212 to associate the navigation links 225 with user experience pages that allow the user to review existing transactions, create new transactions, interact with the customer self-service system content pages, and interact with other miscellaneous pages (e.g., related to tax return preparation, personal finance management, etc.), according to one embodiment. In one embodiment, the user experience page identifiers 221 are included in the customer self-service system content 216 and/or in the user content 218. For example, the user experience page identifiers 221 occupy one or more columns in a table, database, or other data structure used to organize the customer self-service system content 216 and/or the user content 218, according to one embodiment. The search engine 214 and/or the customer self-service system engine 212 identifies the user experience page identifiers 221 by referencing a user experience page identifier column within a data structure that is used to organize the customer self-service system content 216 and/or the user content 218, according to one embodiment.

The search algorithm 228 includes a predictive model 230 for determining potential search queries 232 that may be formulated by the user from the received search query terms 226 and/or the user content 218 and/or the user profile data 251, according to one embodiment. The predictive model 230 is trained to identify potential search queries 232 from the search query terms 226, according to one embodiment. The potential search queries 232 are part of the customer self-service system content 216, according to one embodiment. The predictive model 230 generates likelihoods of potential search queries 234, from which the customer self-service system 210 and/or the search engine 214 can distinguish more-likely from less-likely ones of the potential search queries 232, according to one embodiment. The predictive model 230 identifies the topics of the potential search queries 236 after identifying the potential search queries 232 and after identifying the more relevant ones of the potential search queries 232 (e.g., based on the likelihoods of potential search queries 234), according to one embodiment. The predictive model 230 uses the user content 218 (e.g., existing transaction records) and/or the user profile data 251 (e.g., navigation and search history) in determining the potential search queries 232 and/or the likelihoods of potential search queries 234, according to one embodiment. As an example, if the user has a history of reviewing one or more sent invoices at the beginning of the month, then receiving the term "invoice" as one of the search query terms 226 will increase a likelihood that the potential search queries 232 will be related to reviewing one or more sent invoices, at least partially based on the user profile data 251 (e.g., user's navigation history) and at least partially based on the user content 218 (e.g., reports requested, created, or reviewed), according to one embodiment.

The predictive model 230 is trained from existing searches performed by the search engine 214 and from prior search queries submitted by users to the customer self-service system 210, according to one embodiment. The predictive model 230 is trained using the user content 218, the user profile data 251, and/or using prior search queries submitted by users to the customer self-service system 210, according to one embodiment. The predictive model 230 is trained using one or more predictive model training operation including, but not limited to, regression, logistic regression, decision trees, artificial neural networks, support vector machines, linear regression, nearest neighbor methods, distance based methods, naive Bayes, linear discriminant analysis, and k-nearest neighbor algorithm, according to one embodiment.

The predictive model 230 uses a probabilistic topic model 238 to identify the topics of potential search queries 236, according to one embodiment. The probabilistic topic model 238 receives the potential search queries 232 and/or the search query terms 226 and returns the topics of potential search queries 236 and/or generates topics of search query terms 226, according to one embodiment. The probabilistic topic model 238 utilizes the Latent Dirichlet allocation algorithm to identify the topics of potential search queries 236 and/or the topics of search query terms 239, to enable the predictive model 230 and/or the search engine 214 to match relevant customer self-service system content 216 and/or user content 218 (e.g., an invoice amount or date) with the search query terms 226, according to one embodiment. In one embodiment, the customer self-service system 210 uses the probabilistic topic model 238 to generate/identify customer self-service content topics 240 from the customer self-service system content 216 and/or to generate/identify user content topics 252 from the user content 218, according to one embodiment.

Examples of customer self-service content topics 240 and/or user content topics 252 include, but are not limited to, invoices, receipts, payments, budgets, budget categories, budget thresholds, taxes, quarterly taxes, payroll, employee benefits, travel expenses, mileage deductions, asset tracking, asset valuation, accounts receivable, accounts payable, capital, debts, inventory, customers, vendors, personal exemptions, dependents, personal income tax deductions, and personal income, according to one embodiment. Each of the topics includes one or more sub-topics such as, how to create invoices, how to send invoices, how to aggregate invoices, creating the invoice reports, creating a budget category, adjusting budget thresholds, estimating quarterly taxes, compiling quarterly tax earnings, setting up payroll information, estimating available capital, estimating available inventory, estimating changes in inventory, contacting customers, contacting vendors, how to add new customers and/or vendors, how to track travel expenses, how to enter travel expenses, and the amount spent in travel expenses over a given period of time, according to one embodiment.

The search engine 214 uses the topics of potential search queries 236 and/or the topics of search query terms 239 to match relevant content from the user content 218 and/or the customer self-service system content 216 with the search query terms 226, according to one embodiment. The search engine 214 matches relevant content with search query terms 226 by determining which of the topics of potential search queries 236 are relevant to (e.g., most relevant to) the highest likelihoods of potential search queries 234, and by retrieving portions of the user content 218 and/or customer self-service system content 216 having user content topics 252 and/or customer self-service content topics 240 that match, are similar to, and/or are relevant to those topics of potential search queries 236, according to one embodiment.

The customer self-service system 210 assigns topics to the content of the customer self-service system content 216 and to the user content 218 to facilitate matching portions of the customer self-service system content 216 and/or matching portions of the user content 218 with the search query terms 226 (or with the topics of search query terms 239), according to one embodiment. The customer self-service system 210 applies the content of the customer self-service system content 216 to the probabilistic topic model 238 to define the customer self-service content topics 240, according to one embodiment. The customer self-service system 210 applies the user content 218 to the probabilistic topic model 238 to define the user content topics 252, according to one embodiment. The customer self-service content topics 240 are associated, in a database or other data store, with the content of the customer self-service system content 216, according to one embodiment. The user content topics 252 are associated, in a database or other data store, with the user content 218, according to one embodiment.

The customer self-service system content 216 includes a variety of content that can be provided to the user in response to users' search queries, according to one embodiment. The customer self-service system content 216 includes crowd-sourced customer support content 242, service provider content 244, definitions content 246, potential search queries 232, and customer self-service content topics 240, according to one embodiment. The crowd-sourced customer support content 242 includes questions and responses that are submitted by a community of question askers and response providers that use the customer self-service system 210 or another question and answer customer support system that is associated with the financial management system 270, according to one embodiment. The crowd-sourced customer support content 242 can also be referred to as user generated content ("UGC") to distinguish the crowd-sourced customer support content 242 from the service provider content 244, according to one embodiment. The service provider content 244 includes white papers, questions, answers, frequently asked questions, answers to frequently asked questions, tutorials, audio/video content, interactive content, or other content that can be used to assist users in learning about accounting, running a business, business operations, bookkeeping, the financial management system 270, or other relevant subject matter, according to one embodiment. The definitions content 246 include acronym definitions, definitions of accounting terms (e.g., accountant jargon), and/or definitions of terms that are related to tax law, accounting principles, business management, and the financial management system 270, according to one embodiment.

The user content 218 includes a variety of content that can be provided to the user in response to users' search queries, according to one embodiment. The user content 218 includes, but is not limited to, income of a business, income of the user, accounts receivable value, accounts payable value, amortization of one or more business assets, amount of business taxes paid, amount of personal state or federal taxes paid, an estimate taxes due, assets values, financial reports, business invoices, business receipts, payroll information, inventory, financial institution account information, financial institution balances, records of deductible expenses, personal budget expenditures, personal financial goals, personal financial budgets, personal income information, and personal deductions information, and any other user or business information that is currently used that may be used in the future during the operation of a personal financial management system, business financial management system, and/or a tax return preparation financial management system, according to one embodiment.

The customer self-service system 210 determines which portions of the customer self-service system content 216 and the user content 218 to provide to the user (e.g., in real-time) dynamically as the user enters search query terms 226, according to one embodiment. The customer self-service system 210 determines the potential search queries 232 and provides incremental search content 224 that is based on the search query terms 226, according to one embodiment. Because the potential search queries 232 change based on additions, deletions, or other modifications to the search query terms 226, the customer self-service system 210 dynamically updates the incremental search content 224 that is displayed, as the user adds, deletes, and/or modifies the search query terms 226 within the user experience display 220, according to one embodiment.

The customer self-service system 210 combines customer self-service system content 216 with the user content 218 to generate the incremental search content 224, according to one embodiment. For example, if the customer self-service system 210 determines that the search query terms 226 and/or the potential search queries 232 associated with the search query terms 226 are relevant to the user content 218, the customer self-service system 210 will include at least some of the user content 218 in the incremental search content 224, according to one embodiment. As another example, if the search query terms 226 include "receivable", the customer self-service system 210 may determine that one of the potential search queries 232 is, "What is the value of my account receivable assets?", according to one embodiment. In response to the customer self-service system 210 determining that one of the potential search queries 232 is, "What is the value of my account receivable assets?", the customer self-service system 210 can include the user's current and/or prior calculated account receivables (e.g., $73,512.00) as one of the incremental search results in the incremental search content 224, according to one embodiment.

The customer self-service system 210 uses the user content 218 to generate the incremental search content 224, according to one embodiment. The customer self-service system 210 receives the user content 218 and/or the user profile data 251 from the financial management system 270, according to one embodiment. The customer self-service system 210 is optionally integrated into the financial management system 270 and uses data retrieval commands or calls to retrieve at least part of the user content 218 for use in the incremental search content 224, according to one embodiment.

In one embodiment, the customer self-service system 210, the customer self-service system engine 212 and/or the search engine 214 uses the search query terms 226 and/or the user profile data 251 and/or the user content 218 to determine a query intent 258, to more quickly identify the incremental search content 224. The query intent 258 is determined using the search algorithm 228, the predictive model 230, and/or the probabilistic topic model 238, according to one embodiment. For example, the search engine 214 uses the probabilistic topic model 238 to determine query intent topic 260, which is compared to one or more tables to determine whether the user is seeking help; searching for transaction records, tax information, personal finances, or other user content 218; or is attempting to navigate within the financial management system 270 in order to perform an action, such as create a new transaction or transaction record, according to one embodiment.

The customer self-service system 210 is partially or wholly stored in memory 254 (inclusive of non-volatile memory and volatile memory) and is partially or wholly executed by processors 256, according to one embodiment.

The user computing environment 290 is representative of one or more user computing systems 292 that may be used by one or more users 294 to provide the user content 218 to the financial management system 270, according to one embodiment. The user computing environment 290 may be used to provide search query terms 226 to the customer self-service system 210 (directly or indirectly through the financial management system 270), and may be used to receive incremental search content 224 from the customer self-service system 210 (directly or indirectly through the financial management system 270), according to one embodiment.

FIG. 2B illustrates additional features of the financial management system 270 within the production environment 200, according to one embodiment. The financial management system 270 includes a financial management system engine 272, transaction options 274, and the user content 218 to support operations of one or more personal, business, and/or the tax return preparation financial management systems, according to one embodiment.

The financial management system engine 272 provides the user experience display 276, by which the financial management system engine 272 receives the user content 218 by providing users with user experience content 278 to solicit user responses 280, according to one embodiment. The financial management system engine 272 populates the user experience content 278 with one or more of a variety of transaction options 274, including, but not limited to, forms, payment reports, payroll functions, invoice options, colors, user interface elements, promotions, bank account login features, budget creation tools, and tax-related questions, according to one embodiment. The user experience display 276 incorporates portions of the user experience display 220 (of the customer self-service system 210) to enable the customer self-service system 210 to acquire information from users of the financial management system 270, according to one embodiment.

The financial management system 270 is data that is partially or wholly stored in memory 284 (inclusive of non-volatile memory and volatile memory) and is partially or wholly executed by processors 286, according to one embodiment.

All or part of the customer self-service system 210 is data that is optionally integrated within the financial management system 270 to facilitate the retrieval and sharing of the user content 218 and/or the user profile data 251, according to one embodiment. The customer self-service system 210 shares some computing environment resources (e.g., memory, processors, computer cabinets, networking equipment, etc.) with the financial management system 270 but is a system that can be implemented on computing environment resources that are independent of the financial management system 270 and/or in a different computing environment, according to one embodiment. In one embodiment, portions of the customer self-service system 210 are integrated into the financial management system 270, while the remainder of the customer self-service system 210 operates independent of the financial management system 270. In one embodiment, the financial management system 270 hosts the user experience display 220 (of the customer self-service system 210) while the functionality of the customer self-service system 210 that determines the incremental search content 224 operates on computing environment resources that are independent of the computing environment resources of the financial management system 270, according to one embodiment.

Although the features and functionality of the production environment 200 are illustrated and/or described in terms of individual and/or modularized components, engines, modules, models, databases/data stores, and/or systems, one or more of the functions of one or more of the components, engines, modules, models, databases/data stores, and/or systems are functionally combinable with one or more other described and/or illustrated components, engines, modules, models, databases/data stores, and/or systems, according to one embodiment.

Process

Figure 3A:
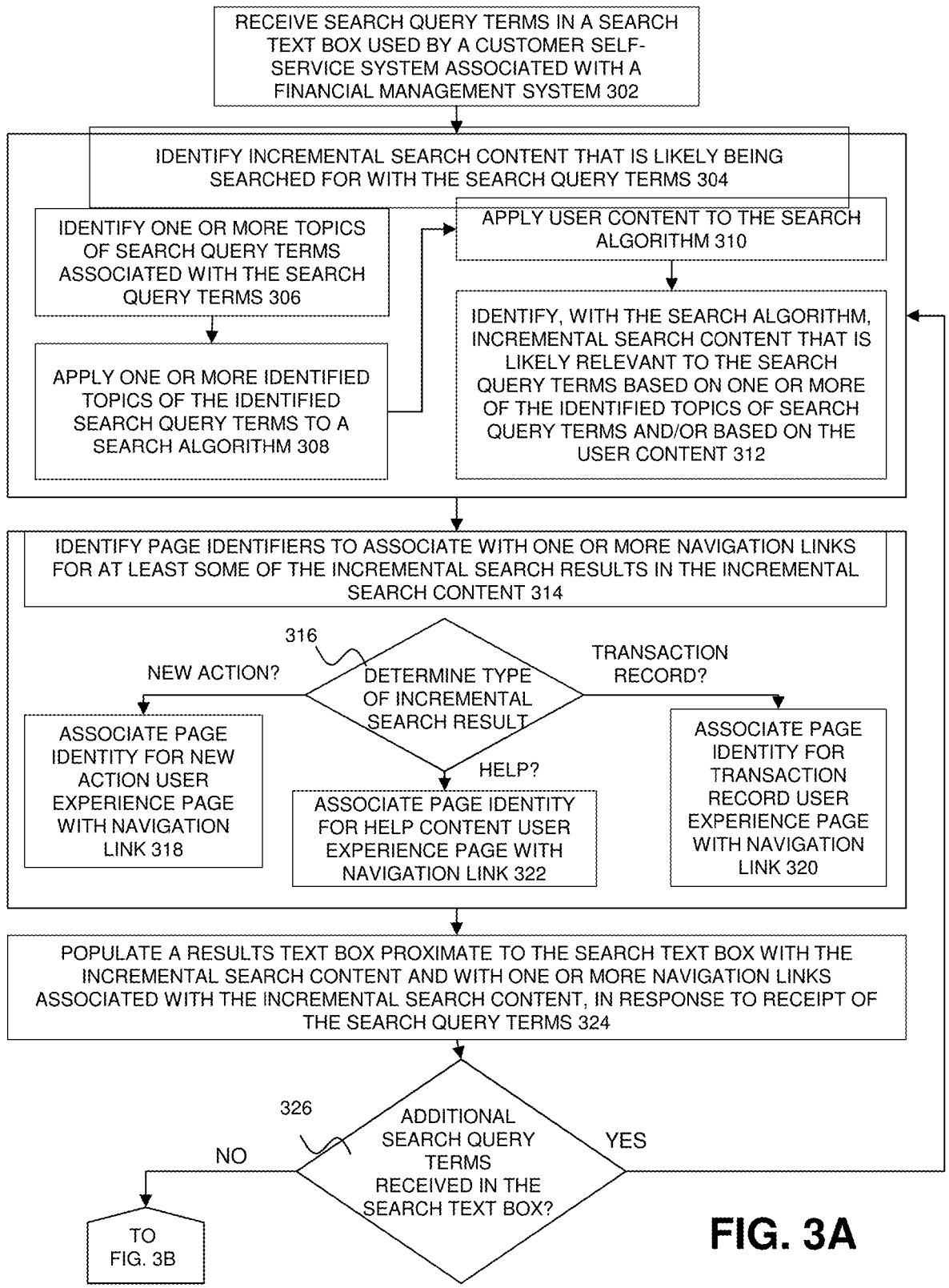
FIGS. 3A and 3B are a flow diagram of a process for searching for and navigating to user content and other user experience pages in a financial management system with a customer self-service system for the financial management system, in accordance with one embodiment.
Figure 3B:
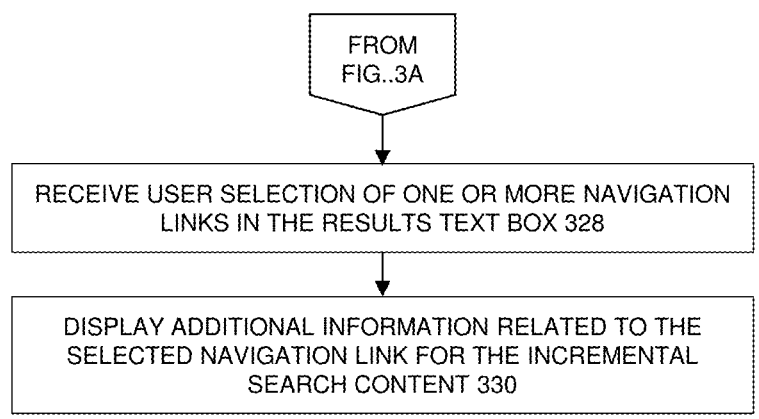

FIGS. 3A and 3B are an example flow diagram of a process 300 for searching for and navigating to user content and other user experience pages in a financial management system with a customer self-service system for the financial management system, according to one embodiment. The process 300 includes operations that may be used by the production environment 200 to generate user experiences/user experience pages similar to the ones illustrated in FIGS. 1A, 1B and/or 1C, according to one embodiment.

At operation 302, the process receives search query terms in a search text box used by a customer self-service system associated with a financial management system, according to one embodiment. Operation 302 proceeds to operation 304, according to one embodiment.

At operation 304, the process identifies incremental search content that is likely being searched for with the search query terms, according to one embodiment. Operation 304 includes sub-operations 306, 308, 310, and/or 312, according to one embodiment.

At operation 306, the process identifies one or more topics of search query terms associated with the search query terms, according to one embodiment. Operation 306 proceeds to operation 308, according to one embodiment.

At operation 308, the process applies one or more identified topics of the identified search query terms to a search algorithm, according to one embodiment. Operation 308 proceeds to operation 310, according to one embodiment.

At operation 310, the process applies user content to the search algorithm, according to one embodiment. Operation 310 proceeds to operation 312, according to one embodiment.

At operation 312, the process identifies, with the search algorithm, incremental search content that is likely relevant to the search query terms based on one or more of the identified topics of search query terms and/or based on the user content, according to one embodiment. Operation 312 and/or operation 304 proceeds to operation 314, according to one embodiment.

At operation 314, the process identifies page identifiers to associate with one or more navigation links for at least some of the incremental search results in the incremental search content, according to one embodiment. Operation 314 includes operations 316, 318, 320, and/or 322, according to one embodiment.

At operation 316, the process determines the type of incremental search result, according to one embodiment. The incremental search content includes a plurality of incremental search results, so operation 314 may loop through operations 316, 318, 320, and 322 in number of iterations prior to proceeding to operation 324, according to one embodiment. The process determines the type of incremental search result in order to identify one or more user experience pages that the user should be navigated towards to assist the user in quickly navigating within a financial management system or within a customer self-service system that supports the financial management system, according to one embodiment. If the incremental search result is associated with performing a new action, operation 316 proceeds to operation 318, according to one embodiment. If the incremental search result is associated with reviewing a transaction record, operation 316 proceeds to operation 320, according to one embodiment. If the incremental search result is associated with requesting help, operation 316 proceeds to operation 322, according to one embodiment.

At operation 318, the process associates page identity for new action user experience page with navigation link, according to one embodiment.

At operation 320, the process associates page identity for transaction record user experience page with navigation link, according to one embodiment.

At operation 322, the process associates page identity for help content user experience page with navigation link, according to one embodiment.

Operation 318, 320, or 322 proceeds to operation 324, according to one embodiment.

At operation 324, the process populates a results text box proximate to the search text box with the incremental search content and with one or more navigation links associated with the incremental search content, in response to receipt of the search query terms, according to one embodiment. Operation 324 proceeds to operation 326, according to one embodiment.

At operation 326, the process determines if additional search query terms are received in the search text box, according to one embodiment. If additional search query terms were received in the search text box, operation 326 returns to operation 304, according to one embodiment. If additional search query terms are not received in the search text box, operation 316 proceeds to operation 328 (shown in FIG. 3B), according to one embodiment.

At operation 328, the process receives a user selection of one or more navigation links in the results text box, according to one embodiment. For example, the user clicks on one of the navigation links for one of the incremental search results provided in the results text box, according to one embodiment. Operation 328 proceeds to operation 330, according to one embodiment.

At operation 330, the process displays additional information related to the selected navigation link for the incremental search content, according to one embodiment. The customer self-service system provides tutorials, audio/video content, additional search results, relevant and similar questions with corresponding answers in one or more traditional search results pages (e.g., webpages), according to one embodiment.

Figure 4A:
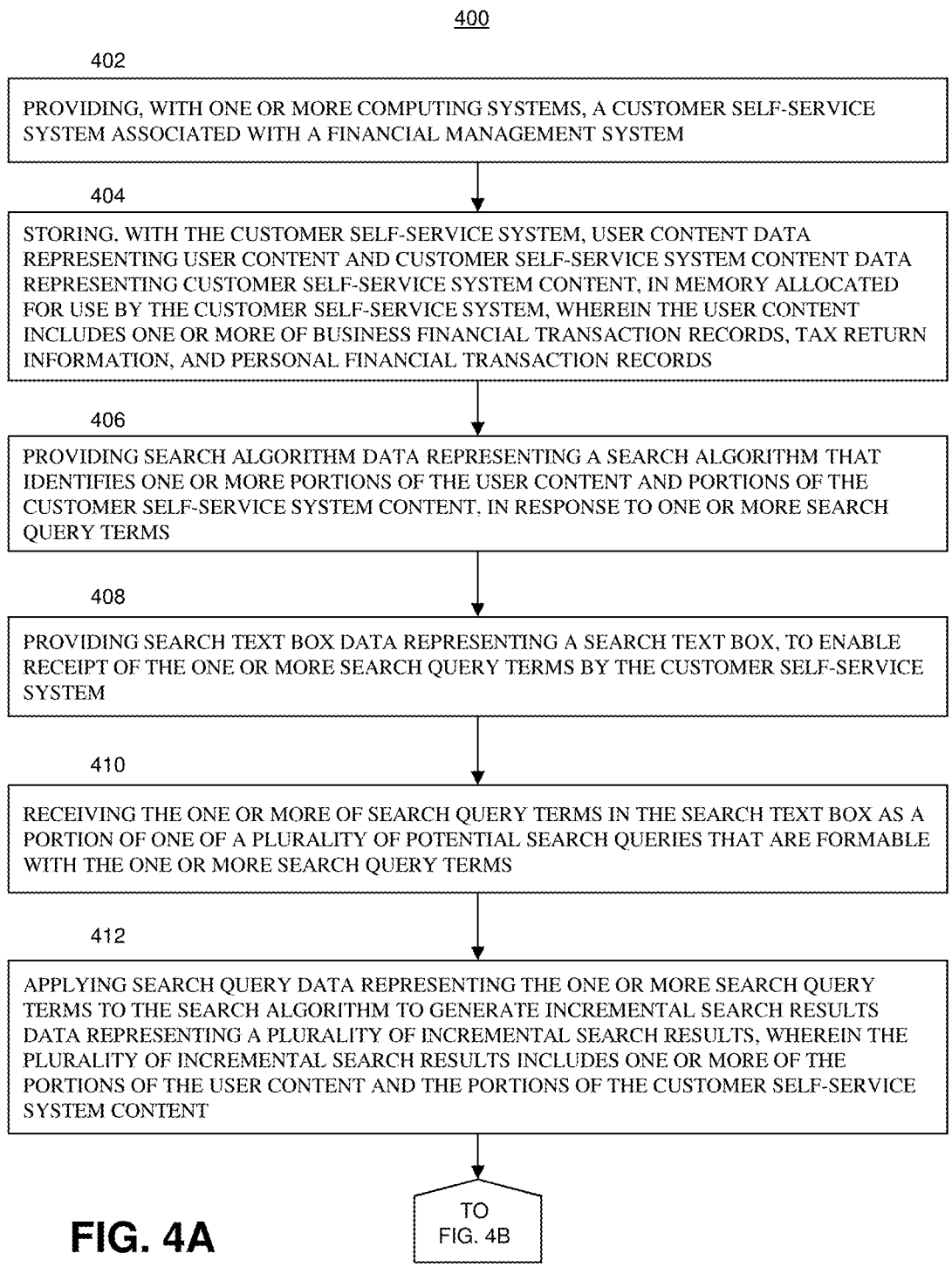
FIGS. 4A and 4B are a flow diagram of a process for searching for and navigating to user content and other user experience pages in a financial management system with a customer self-service system for the financial management system, in accordance with one embodiment.
Figure 4B:
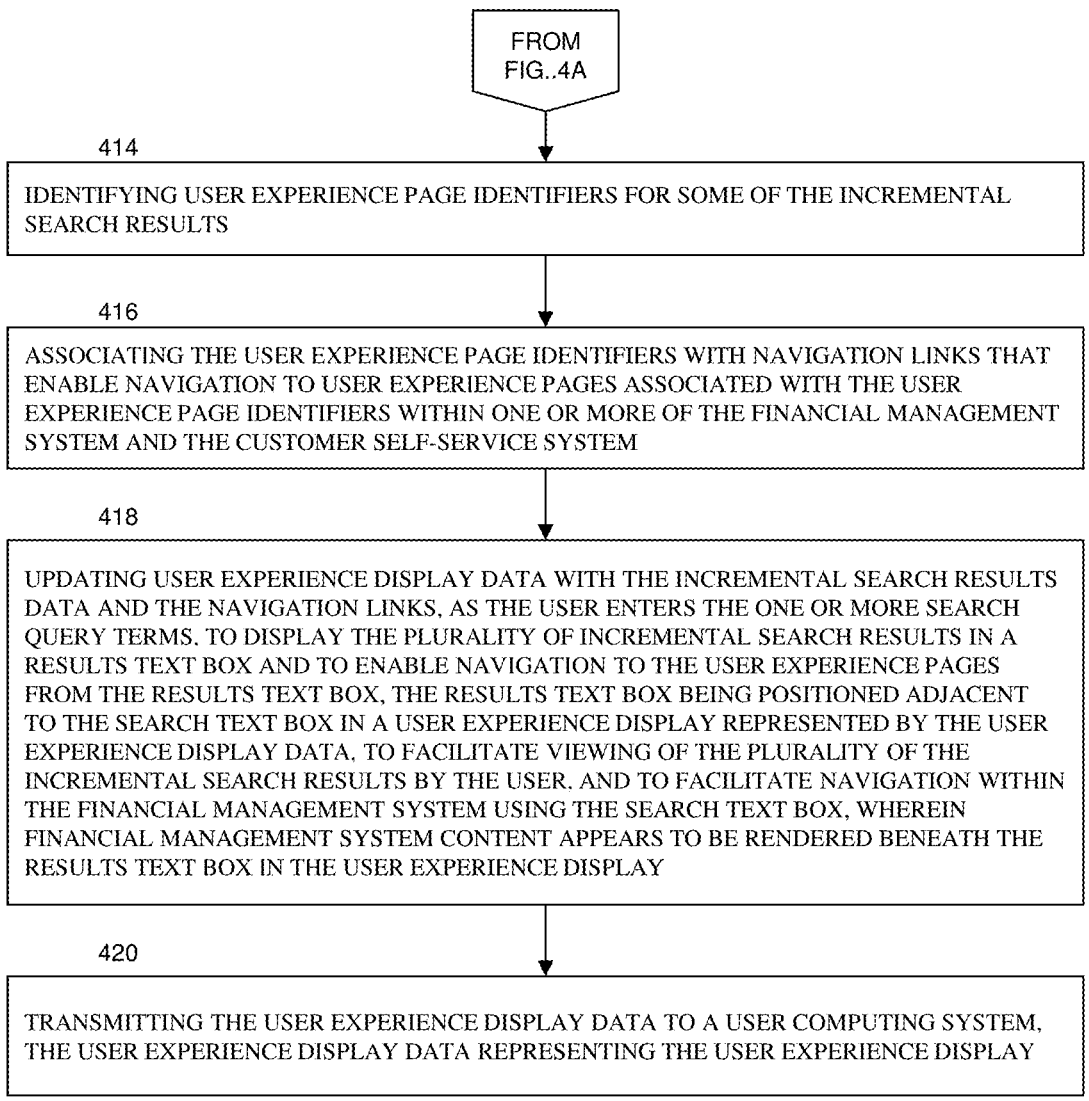

FIGS. 4A and 4B are an example flow diagram of a process 400 for searching for and navigating to user content and other user experience pages in a financial management system with a customer self-service system for the financial management system, according to one embodiment.

At operation 402, the process includes providing, with one or more computing systems, a customer self-service system associated with a financial management system, according to one embodiment. Operation 402 proceeds to operation 404, according to one embodiment.

At operation 404, the process includes storing, with the customer self-service system, user content data representing user content and customer self-service system content data representing customer self-service system content, in memory allocated for use by the customer self-service system, wherein the user content includes one or more of business financial transaction records, tax return information, and personal financial transaction records, according to one embodiment. Operation 404 proceeds to operation 406, according to one embodiment.

At operation 406, the process includes providing search algorithm data representing a search algorithm that identifies one or more portions of the user content and portions of the customer self-service system content, in response to one or more search query terms, according to one embodiment. In one embodiment, the portions of the user content and/or the portions of the customer self-service system content are relevant to the search query terms because the portions of the user content and/or the portions of the customer self-service system content have the same or similar topics as the search query terms. In one embodiment, the portions of the user content and/or portions of the customer self-service system content are relevant to the search query terms because the portions of the user content and/or the portions of the customer self-service system content are matched to the search query terms with a search algorithm, probabilistic topic model, and/or predictive model. Operation 406 proceeds to operation 408, according to one embodiment.

At operation 408, the process includes providing search text box data representing a search text box, to enable receipt of the one or more search query terms by the customer self-service system, according to one embodiment. Operation 408 proceeds to operation 410, according to one embodiment.

At operation 410, the process includes receiving the one or more of search query terms in the search text box as a portion of one of a plurality of potential search queries that are formable with the one or more search query terms, according to one embodiment. Operation 410 proceeds to operation 412, according to one embodiment.

At operation 412, the process includes applying search query data representing the one or more search query terms to the search algorithm to generate incremental search results data representing a plurality of incremental search results, wherein the plurality of incremental search results includes one or more of the portions of the user content and the portions of the customer self-service system content, according to one embodiment. Operation 412 proceeds to operation 414, according to one embodiment.

At operation 414, the process includes identifying user experience page identifiers for some of the incremental search results, according to one embodiment. Operation 414 proceeds to operation 416, according to one embodiment.

At operation 416, the process includes associating the user experience page identifiers with navigation links that enable navigation to user experience pages associated with the user experience page identifiers within one or more of the financial management system and within the customer self-service system, according to one embodiment. Operation 416 proceeds to operation 418, according to one embodiment.

At operation 418, the process includes updating user experience display data with the incremental search results data and the navigation links, as the user enters the one or more search query terms, to display the plurality of incremental search results in a results text box and to enable navigation to the user experience pages from the results text box, the results text box being positioned adjacent to the search text box in a user experience display represented by the user experience display data, to facilitate viewing of the plurality of the incremental search results by the user, and to facilitate navigation within the financial management system using the search text box, wherein financial management system content appears to be rendered beneath the results text box in the user experience display, according to one embodiment. Operation 418 proceeds to operation 420, according to one embodiment.

At operation 420, the process includes transmitting the user experience display data to a user computing system, the user experience display data representing the user experience display, according to one embodiment.

As noted above, the specific illustrative examples discussed above are but illustrative examples of implementations of embodiments of the method or process for providing domain-specific incremental search results for search query terms with a customer self-service system for a financial management system. Those of skill in the art will readily recognize that other implementations and embodiments are possible. Therefore, the discussion above should not be construed as a limitation on the claims provided below.

Searching for and navigating to transactions and other user experience pages in a financial management system with a customer self-service system for the financial management system is not an abstract idea and allows for significant improvement to the fields of user experience, self-service systems, customer service, customer retention, business management, financial management, and domain-specific search engines, according to one embodiment. The present disclosure adds significantly to the concept of content searching by providing domain-specific incremental search results for search query terms with a customer self-service system for one or more financial management systems because the customer self-service system: reduces the amount of time users spend searching for use content (e.g., transactions); reduces the amount of time users spend locating user content in a user experience page; assists users in formulating search queries for information that they are searching for; and reduces the amount of time users spend entering a search query and navigating to user experience pages in a financial management system, according to one embodiment. As a result, embodiments of the present disclosure allow for reduced use of processor cycles, memory, and power consumption, by reducing the time spent by users searching for and navigating to user content (and other customer self-service system content) and by reducing time spent by users to repeatedly search for user content or a user experience page in computing environments, according to one embodiment. Consequently, computing and communication systems implementing and/or providing the embodiments of the present disclosure are transformed into more operationally efficient devices and systems.

In addition to improving overall computing performance, searching for and navigating to user content and other user experience pages in a financial management system with a customer self-service system for the financial management system significantly improves the field of financial management systems, by reducing the amount of time that a user is removed from the operations tasks of running the user's business due to delays caused by trying to find transactions or particular user experience pages (e.g., to complete a task), according to one embodiment. Furthermore, by searching for and navigating to transactions and other user experience pages in a financial management system with a customer self-service system for the financial management system, the disclosed embodiments help maintain and/or build trust and therefore loyalty in the financial management system with which the customer self-service system is associated, which results in repeat customers, and reduced abandonment of use of the financial management system, according to one embodiment.

In accordance with an embodiment, a computing system implemented method searches for and navigates to user content in a financial management system with a customer self-service system for the financial management system. The method includes providing, with one or more computing systems, a customer self-service system associated with a financial management system, according to one embodiment. The method includes storing, with the customer self-service system, user content data representing user content and customer self-service system content data representing customer self-service system content, in memory allocated for use by the customer self-service system, wherein the user content includes one or more of business financial transaction records, tax return information, and personal financial transaction records, according to one embodiment. The method includes providing search algorithm data representing a search algorithm that identifies portions of the user content and/or portions of the customer self-service system content, in response to one or more search query terms, according to one embodiment. The method includes providing search text box data representing a search text box, to enable receipt of the one or more search query terms by the customer self-service system, according to one embodiment. The method includes receiving the one or more of search query terms in the search text box as a portion of one of a plurality of potential search queries that are formable with the one or more search query terms, according to one embodiment. The method includes applying search query data representing the one or more search query terms to the search algorithm to generate incremental search results data representing a plurality of incremental search results, wherein the plurality of incremental search results includes the portions of the user content and/or the portions of the customer self-service system content, according to one embodiment. The method includes identifying user experience page identifiers for some of the incremental search results, according to one embodiment. The method includes associating the user experience page identifiers with navigation links that enable navigation to user experience pages associated with the user experience page identifiers within the financial management system and/or within the customer self-service system, according to one embodiment. The method includes updating user experience display data with the incremental search results data and the navigation links, as the user enters the one or more search query terms, to display the plurality of incremental search results in a results text box and to enable navigation to the user experience pages from the results text box, the results text box being positioned adjacent to the search text box in a user experience display represented by the user experience display data, to facilitate viewing of the plurality of the incremental search results by the user, and to facilitate navigation within the financial management system using the search text box, wherein financial management system content appears to be rendered beneath the results text box in the user experience display, according to one embodiment. The method includes transmitting the user experience display data to a user computing system, the user experience display data representing the user experience display, according to one embodiment.

In accordance with an embodiment, a financial management system includes a customer self-service system that provides incremental search results for search query terms. The financial management system includes a user experience display that receives search query terms from users of a financial management system, and that provides incremental search content in response to receipt of the search query terms, according to one embodiment. The financial management system includes a user content data store that stores user content data representing user content, for the financial management system, in memory that is allocated for use by the financial management system, according to one embodiment. The financial management system includes a customer self-service system content store that stores customer self-service system content data, representing customer self-service system content, in memory that is allocated for use by a customer self-service system that provides customer self-service searches for the financial management system, according to one embodiment. The financial management system includes a navigation data store that stores user experience page identifier data representing user experience page identifiers for user experience pages that display the user content and/or that display the customer self-service system content, in memory that is allocated for use by the financial management system, according to one embodiment. The financial management system includes a search text box that receives search query term data representing the search query terms, wherein the search query terms constitute at least part of at least one potential search query, wherein the search text box is positioned within the user experience display and proximate to financial management system content provided to the users, the financial management system content being represented by financial management system content data, according to one embodiment. The financial management system includes a results text box that displays incremental search content data representing incremental search content that the customer self-service system provides in response to the at least one potential search query, wherein the results text box is adjacent to the search text box in the user experience display, wherein the results text box is rendered as overlaid over at least part of the financial management system content in the user experience display, according to one embodiment. The financial management system includes a customer self-service system engine configured to apply the search query term data to a search algorithm to generate the incremental search content data, in response to receipt of the search query term data, according to one embodiment. The incremental search content includes at least part of the user content representing one or more transaction records for the user in the financial management system, at least part of the customer self-service system content representing at least some of the customer self-service system content, and navigation links associated with user experience page identifiers for the user experience pages that display the at least part of the user content and the at least some of the customer self-service content, according to one embodiment. The incremental search content is displayed in real-time in the results text box to facilitate viewing of the incremental search content by the user as the user enters each of the one or more search query terms into the search text box, according to one embodiment. The navigation links, if selected by a user, navigate the user from the results text box to one of the user experience pages that display the at least part of the user content and the at least some of the customer self-service content, according to one embodiment.

In accordance with an embodiment, a system searches for and navigates to user content and other user experience pages in a financial management system with a customer self-service system for the financial management system. The system includes one or more processors and memory having instructions which, if executed by the one or more processors, cause the one or more processors to perform a process for searching for and navigating to user content and other user experience pages in a financial management system with a customer self-service system for the financial management system, according to one embodiment. The process includes receiving search query data representing one or more search query terms, from a user, according to one embodiment. The process includes applying the search query data to a search algorithm to generate incremental search results data representing a plurality of incremental search results, wherein the plurality of incremental search results includes portions of user content stored by a financial management system and/or portions of customer self-service system content stored by a customer self-service system, according to one embodiment. The process includes identifying user experience page identifiers for some of the incremental search results by searching one or more data stores that store the user content and/or the customer self-service system content, according to one embodiment. The process includes associating the user experience page identifiers with navigation links that enable navigation to user experience pages within the financial management system and/or within the customer self-service system, the navigation links being represented by navigation link data, the user experience pages being associated with the user experience page identifiers, according to one embodiment. The process includes updating user experience display data with the incremental search results data and the navigation link data, as the user enters the one or more search query terms into a search text box, to display the plurality of incremental search results in a results text box and to enable navigation to the user experience pages from the results text box, the results text box being positioned adjacent to the search text box in a user experience display represented by the user experience display data, to facilitate viewing the plurality of the incremental search results by the user, and to facilitate navigation within the financial management system and/or the customer self-service system using the search text box, wherein financial management system content appears to be rendered beneath the results text box in the user experience display, according to one embodiment. The process includes transmitting the user experience display data to a user computing system, the user experience display data representing the user experience display, according to one embodiment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for searching for and navigating to user content and other user experience pages in a financial management system with a customer self-service system for the financial management system, comprising:

providing, with one or more computing systems, a customer self-service system associated with a financial management system;

storing, with the customer self-service system, user content data representing user content and customer self-service system content data representing customer self-service system content, in memory allocated for use by the customer self-service system, wherein the user content includes user profile data representing navigation history of a user in the financial management system and one or more of an estimated income level of the user and estimated education level of the user and whether the user is a repeat user or is alternatively a first-time user, and further includes one or more of business financial transaction records, tax return information, and personal financial transaction records;

providing search algorithm data representing a search algorithm that identifies, based at least on user profile data representing navigation history of a user in the financial management system and one or more of an estimated income level of the user and estimated education level of the user and whether the user is a repeat user or is alternatively a first-time user, one or more of portions of the user content and portions of the customer self-service system content, in response to one or more search query terms;

providing search text box data representing a search text box, to enable receipt of the one or more search query terms by the customer self-service system;

receiving the one or more of search query terms in the search text box as a portion of one of a plurality of potential search queries that are formable with the one or more search query terms;

determining, from a set of possible types of incremental search results, a type of incremental search result to be provided to the user, the set of possible incremental search results including a first type associated with performing a new action, a second type associated with reviewing a transaction record, and a third type associated with requesting help;

applying search query data representing the one or more search query terms to the search algorithm to generate, based at least on user profile data representing navigation history of a user in the financial management system and one or more of an estimated income level of the user and estimated education level of the user and whether the user is a repeat user or is alternatively a first-time user, incremental search results data representing a plurality of incremental search results, the incremental search results data being associated with the determined type of incremental search result, wherein the plurality of incremental search results includes the one or more of portions of the user content at least including the user profile data, the generated user content including one or more of business financial transaction records, tax return information, and personal financial transaction records, the plurality of incremental search results further including portions of the customer self-service system content;

identifying user experience page identifiers for some of the incremental search results;

associating the user experience page identifiers with navigation links that enable navigation to user experience pages associated with the user experience page identifiers within one or more of the financial management system and the customer self-service system;

updating user experience display data with the incremental search results data and the navigation links, as the user enters the one or more search query terms, to display the plurality of incremental search results in a results text box and to enable navigation to the user experience pages from the results text box, the results text box being positioned adjacent to the search text box in a user experience display represented by the user experience display data, to facilitate viewing of the plurality of the incremental search results by the user, and to facilitate navigation within the financial management system using the search text box, wherein financial management system content appears to be rendered beneath the results text box in the user experience display; and transmitting the user experience display data to a user computing system, the user experience display data representing the user experience display.

2. The computing system implemented method of claim 1, wherein the financial management system is one or more of a personal financial management system, a business financial management system, a tax return preparation financial management system, or a combination of two or more of the personal financial management system, the business financial management system, and the tax return preparation financial management system.

3. The computing system implemented method of claim 1, wherein the user content is selected from a group of user content, consisting of:

transaction records for a business financial management system;

transaction records for a personal financial management system;

financial budgets for a personal financial management system; and tax information for a tax return preparation financial management system.

4. The computing system implemented method of claim 1, wherein the navigation links are appended to the incremental search results or are integrated into the incremental search results by causing one or more words in some of the incremental search results to be hyperlinks that navigate a user from the results text box to one of the user experience pages associated with the user experience page identifiers.

5. The computing system implemented method of claim 1, wherein the plurality of incremental search results includes references to actions that are available for a user to complete using the financial management system,
  wherein the user experience page identifiers are associated with user experience pages that enable the user to complete one or more of the actions,
  wherein the user experience page identifiers are associated with the navigation links, which are selectable from the results text box.

6. The computing system implemented method of claim 1, wherein the customer self-service system is integrated into the financial management system and is one of a plurality of functions of the financial management system.

7. The computing system implemented method of claim 1, wherein the user computing system is a mobile computing device and updating the user experience display data with the incremental search results data facilitates searching the user content and the customer self-service system content from the mobile computing device.

8. The computing system implemented method of claim 1, further comprising:
  determining one or more of the plurality of potential search queries that are formable with the one or more search query terms; and
  applying the one or more of the plurality of potential search queries to the search algorithm to generate at least part of the incremental search results data based on the one or more potential search queries.

9. The computing system implemented method of claim 1, further comprising:
  applying at least part of the user content data and the one or more search query terms to a predictive model to determine the plurality of potential search queries, which the user is likely to enter into the search text box; and
  generating at least part of the incremental search results data based on the plurality of potential search queries.

10. The computing system implemented method of claim 1, wherein the results text box is positioned adjacent and below the search text box in user experience display.

11. The computing system implemented method of claim 1, wherein the search algorithm generates the incremental search results data at least partially based on topics of the one or more of search query terms, the topics being determined by a probabilistic topic model.

12. The computing system implemented method of claim 1, wherein the search algorithm includes one or more of a probabilistic topic model and a predictive model.

13. The computing system implemented method of claim 12, wherein the predictive model is trained using one or more training operations that are selected from a group of predictive model training operations, consisting of:
  regression;
  logistic regression;
  decision trees;
  artificial neural networks;
  support vector machines;
  linear regression;
  nearest neighbor methods;
  distance based methods;
  naive Bayes;
  linear discriminant analysis; and
  k-nearest neighbor algorithm.

14. The computing system implemented method of claim 1, wherein the customer self-service system content is selected from a group of customer self-service system content, consisting of:
  crowd-sourced customer support content;
  service provider content;
  definitions content, wherein the definitions content includes explanations of one or more acronyms and definitions of tax-specific terms;
  suggested potential search queries; and
  user tax data for the user.

15. The computing system implemented method of claim 1, wherein the user content is selected from a group of user content options, consisting of:
  income of a business;
  income of the user;
  accounts receivable value;
  accounts payable value;
  amortization of one or more business assets;
  amount of business taxes paid;
  amount of personal state or federal taxes paid;
  an estimate taxes due;
  assets values;
  financial reports;
  business invoices;
  business receipts;
  payroll information;
  inventory;
  financial institution account information;
  financial institution balances;
  records of deductible expenses;
  personal budget expenditures;
  personal financial goals;
  personal financial budgets;
  personal income information; and
  personal deductions information.

16. A financial management system having a customer self-service system that provides incremental search results for search query terms, comprising:
  a user experience display that receives search query terms from users of a financial management system, and that provides incremental search content in response to receipt of the search query terms;
  a user content data store that stores user content data representing user content, the user content including user profile data representing navigation history of a user in the financial management system and one or more of an estimated income level of the user and estimated education level of the user and whether the user is a repeat user or is alternatively a first-time user, and the user content data is stored, for the financial management system, in memory that is allocated for use by the financial management system;
  a customer self-service system content store that stores customer self-service system content data, representing customer self-service system content, in memory that is allocated for use by a customer self-service system that provides customer self-service searches for the financial management system;
  a navigation data store that stores user experience page identifier data representing user experience page identifiers for user experience pages that display one or more of the user content and the customer self-service system content, in memory that is allocated for use by the financial management system;

a search text box that receives search query term data representing the search query terms, wherein the search query terms constitute at least part of at least one potential search query, wherein the search text box is positioned within the user experience display and proximate to financial management system content provided to the users, the financial management system content being represented by financial management system content data;

a results text box that displays incremental search content data representing incremental search content that the customer self-service system provides in response to the at least one potential search query, wherein the results text box is adjacent to the search text box in the user experience display, wherein the results text box is rendered as overlaid over at least part of the financial management system content in the user experience display; and a customer self-service system engine configured to apply the search query term data to a search algorithm to determine, from a set of possible types of incremental search results, a type of incremental search result to be provided to the user, the set of possible incremental search results including a first type associated with performing a new action, a second type associated with reviewing a transaction record, and a third type associated with requesting help, and to generate, by considering at least user profile data representing navigation history of a user in the financial management system and one or more of an estimated income level of the user and estimated education level of the user and whether the user is a repeat user or is alternatively a first-time user, the incremental search content data, in response to receipt of the search query term data, wherein the incremental search content includes at least part of the user content representing one or more transaction records for the user in the financial management system, at least part of the customer self-service system content representing at least some of the customer self-service system content, and navigation links associated with user experience page identifiers for the user experience pages that display the at least part of the user content and the at least some of the customer self-service content, wherein the incremental search content is displayed in real-time in the results text box to facilitate viewing of the incremental search content by the user as the user enters each of the one or more search query terms into the search text box, wherein the navigation links, if selected by a user, navigate the user from the results text box to one of the user experience pages that display the at least part of the user content and the at least some of the customer self-service content.

17. The financial management system of claim 16, wherein the search algorithm generates the incremental search content data, at least partially based on: topics of the one or more search query terms, topics of the user content, and topics of customer self-service system content.

18. The financial management system of claim 17, wherein the customer self-service system engine applies the one or more search query terms, the user content, and the customer self-service system content to a probabilistic topics model to identify the topics of the one or more search query terms, the topics of the user content, and the topics of customer self-service system content.

19. The financial management system of claim 16, wherein the customer self-service system content is selected from a group of customer self-service system content, consisting of:
crowd-sourced customer support content;
service provider content;
definitions content, wherein the definitions content includes explanations of one or more acronyms and definitions of tax-specific terms;
suggested potential search queries; and
user tax data for the user.

20. The financial management system of claim 16, wherein the user content is selected from a group of user content options, consisting of:
income of a business;
income of the user;
accounts receivable value;
accounts payable value;
amortization of one or more business assets;
amount of business taxes paid;
amount of personal state or federal taxes paid;
an estimate taxes due;
assets values;
financial reports;
business invoices;
business receipts;
payroll information;
inventory;
financial institution account information;
financial institution balances;
records of deductible expenses;
personal budget expenditures;
personal financial goals;
personal financial budgets;
personal income information; and
personal deductions information.

21. A system that searches for and navigates to user content and other user experience pages in a financial management system with a customer self-service system for the financial management system, comprising:
one or more processors; and
memory having instructions which, when executed by the one or more processors, cause the one or more processors to perform a process comprising:
receiving search query data representing one or more search query terms, from a user;
determining, from a set of possible types of incremental search results, a type of incremental search result to be provided to the user, the set of possible incremental search results including a first type associated with performing a new action, a second type associated with reviewing a transaction record, and a third type associated with requesting help;
applying the search query data to a search algorithm to generate, based at least on user profile data representing navigation history of a user in the financial management system and one or more of an estimated income level of the user and estimated education level of the user and whether the user is a repeat user or is alternatively a first-time user, incremental search results data representing a plurality of incremental search results, wherein the plurality of incremental search results includes one or more portions of user content stored by a financial management system and at least including the user profile data, the generated user content including one or more of business financial transaction records, tax return information, and personal financial transaction records, the plurality of incremental search results further including portions of customer self-service system content stored by a customer self-service system;

identifying user experience page identifiers for some of the incremental search results by searching one or more data stores that store one or more of the user content and the customer self-service system content;

associating the user experience page identifiers with navigation links that enable navigation to user experience pages within one or more of the financial management system and the customer self-service system, the navigation links being represented by navigation link data, the user experience pages being associated with the user experience page identifiers;

updating user experience display data with the incremental search results data and the navigation link data, as the user enters the one or more search query terms into a search text box, to display the plurality of incremental search results in a results text box and to enable navigation to the user experience pages from the results text box, the results text box being positioned adjacent to the search text box in a user experience display represented by the user experience display data, to facilitate viewing the plurality of the incremental search results by the user, and to facilitate navigation within one or more of the financial management system and the customer self-service system using the search text box, wherein financial management system content appears to be rendered beneath the results text box in the user experience display; and transmitting the user experience display data to a user computing system, the user experience display data representing the user experience display.

22. The system of claim 21, wherein the financial management system is a personal financial management system, a business financial management system, a tax return preparation financial management system, or a combination of two or more of the personal financial management system, the business financial management system, and the tax return preparation financial management system.

23. The system of claim 21, wherein the user content is selected from a group of user content, consisting of:
transaction records for a business financial management system;
transaction records for a personal financial management system;
financial budgets for a personal financial management system; and
tax information for a tax return preparation financial management system.

24. The system of claim 21, wherein the navigation links are appended to the incremental search results or are integrated into the incremental search results by causing one or more words in some of the incremental search results to be selectable by the user to navigate the user from the results text box to one of the user experience pages associated with the user experience page identifiers.

25. The system of claim 21, wherein the plurality of incremental search results includes references to actions that are available for a user to complete using the financial management system,
wherein the user experience page identifiers are associated with user experience pages that enable the user to complete one or more of the actions.

26. The system of claim 21, wherein the results text box is positioned adjacent and below the search text box in user experience display.

27. The system of claim 21, wherein the search algorithm generates the incremental search results data at least partially based on topics of the one or more of search query terms, the topics being determined by a probabilistic topic model.

28. The system of claim 21, wherein the search algorithm includes one or more of a probabilistic topic model and a predictive model.

29. The system of claim 21, wherein the customer self-service system content is selected from a group of customer self-service system content, consisting of:
crowd-sourced customer support content;
service provider content;
definitions content, wherein the definitions content includes explanations of one or more acronyms and definitions of tax-specific terms;
suggested potential search queries; and
user tax data for the user.

30. The system of claim 21, wherein the user content is selected from a group of user content options, consisting of:
income of a business;
income of the user;
accounts receivable value;
accounts payable value;
amortization of one or more business assets;
amount of business taxes paid;
amount of personal state or federal taxes paid;
an estimate taxes due;
assets values;
financial reports;
business invoices;
business receipts;
payroll information;
inventory;
financial institution account information;
financial institution balances;
records of deductible expenses;
personal budget expenditures;
personal financial goals;
personal financial budgets;
personal income information; and
personal deductions information.

* * * * *